(12) United States Patent
Muller

(10) Patent No.: US 12,460,750 B2
(45) Date of Patent: Nov. 4, 2025

(54) FLEXIBLE CASING SYSTEMS AND METHODS

(71) Applicant: Deep Isolation, Inc., Berkeley, CA (US)

(72) Inventor: Richard A. Muller, Berkeley, CA (US)

(73) Assignee: Deep Isolation, Inc., Berkeley, CA (US)

( * ) Notice: Subject to any disclaimer, the term of this patent is extended or adjusted under 35 U.S.C. 154(b) by 51 days.

(21) Appl. No.: 18/032,284

(22) PCT Filed: Oct. 18, 2021

(86) PCT No.: PCT/US2021/055448
§ 371 (c)(1),
(2) Date: Apr. 17, 2023

(87) PCT Pub. No.: WO2022/082112
PCT Pub. Date: Apr. 21, 2022

(65) Prior Publication Data
US 2023/0408001 A1 Dec. 21, 2023

Related U.S. Application Data

(60) Provisional application No. 63/144,832, filed on Feb. 2, 2021, provisional application No. 63/093,125, filed on Oct. 16, 2020.

(51) Int. Cl.
*F16L 15/00* (2006.01)
*B09B 1/00* (2006.01)
(Continued)

(52) U.S. Cl.
CPC .......... *F16L 15/006* (2013.01); *B09B 1/008* (2013.01); *E21B 17/042* (2013.01);
(Continued)

(58) Field of Classification Search
CPC ....... F16L 15/006; F16L 15/08; F16L 15/007; F16L 27/04; F16L 27/02; E21B 17/042
(Continued)

(56) References Cited

U.S. PATENT DOCUMENTS 1,570,155 A * 1/1926 Karbowski ............. F16L 15/08
285/341
1,729,483 A * 9/1929 Koch ...................... H02G 3/06
285/280
(Continued)

FOREIGN PATENT DOCUMENTS

KR 20100127588 12/2010

OTHER PUBLICATIONS

International Preliminary Report on Patentability in International Appln. No. PCT/US2021/055448, mailed on Apr. 27, 2023, 10 pages.
(Continued)

*Primary Examiner* — David Bochna
(74) *Attorney, Agent, or Firm* — Fish & Richardson P.C.

(57) ABSTRACT

A casing joint includes a tubular including a particular length, a particular diameter, and a first wall thickness; a male connection formed on a first end of the tubular, the male connection including an axial length and a plurality of threads formed on a portion of an external surface of the male connection less than the axial length of the male connection; and a female connection formed on a second end of the tubular opposite the first end, the female connection including an axial length and a plurality of threads formed on a portion of an internal surface of the female connection less than the axial length of the female connection.

37 Claims, 14 Drawing Sheets

(51) Int. Cl.
  *E21B 17/042* (2006.01)
  *E21B 17/046* (2006.01)
  *F16L 15/08* (2006.01)
  *G21F 9/34* (2006.01)
  *F16L 27/04* (2006.01)

(52) U.S. Cl.
  CPC ............ *E21B 17/046* (2013.01); *F16L 15/08* (2013.01); *G21F 9/34* (2013.01); *F16L 15/007* (2013.01); *F16L 27/04* (2013.01)

(58) Field of Classification Search
  USPC ......................................................... 285/302
  See application file for complete search history.

(56) References Cited

U.S. PATENT DOCUMENTS

| | | | | |
|---|---|---|---|---|
| 1,846,539 | A * | 2/1932 | Baurmann | E21B 17/08 166/242.6 |
| 2,533,097 | A * | 12/1950 | Dale | F16L 27/1274 285/302 |
| 2,955,850 | A * | 10/1960 | Bellinger | F16L 27/026 285/302 |
| 4,083,410 | A * | 4/1978 | Anderson | A62C 37/10 285/302 |
| 4,932,686 | A * | 6/1990 | Anderson, Jr. | F16L 27/12 285/302 |
| 5,248,004 | A * | 9/1993 | Witte | E21B 7/067 175/325.5 |
| 6,485,061 | B1 | 11/2002 | Mosgin et al. | |
| 7,111,873 | B1 * | 9/2006 | Coogle | B08B 9/0321 285/298 |
| 2002/0167173 | A1 * | 11/2002 | Griffin | F16L 15/007 285/390 |
| 2006/0061098 | A1 * | 3/2006 | Hovem | E21B 43/103 285/333 |
| 2015/0240571 | A1 * | 8/2015 | Bowles | E21B 17/04 285/351 |
| 2016/0025248 | A1 * | 1/2016 | Peirce | F16L 15/08 285/179 |
| 2017/0175459 | A1 * | 6/2017 | Wajnikonis | F16L 15/08 |
| 2019/0063649 | A1 * | 2/2019 | Snyder, II | B29C 65/56 |
| 2022/0196189 | A1 * | 6/2022 | Andersen | F16L 15/006 |

OTHER PUBLICATIONS

International Search Report and Written Opinion in International Appln. No. PCT/US2021/055448, mailed on Feb. 8, 2022, 15 pages.

* cited by examiner

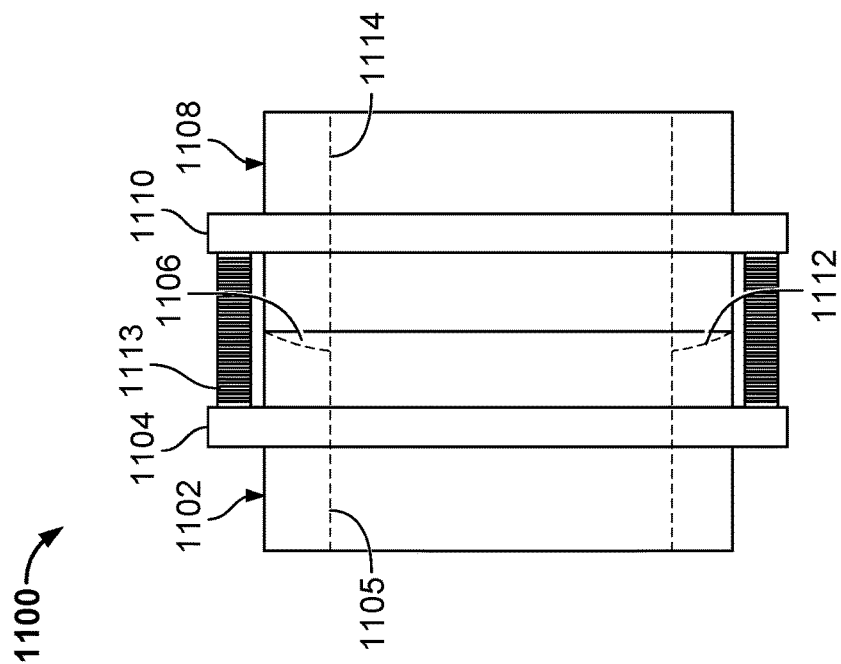
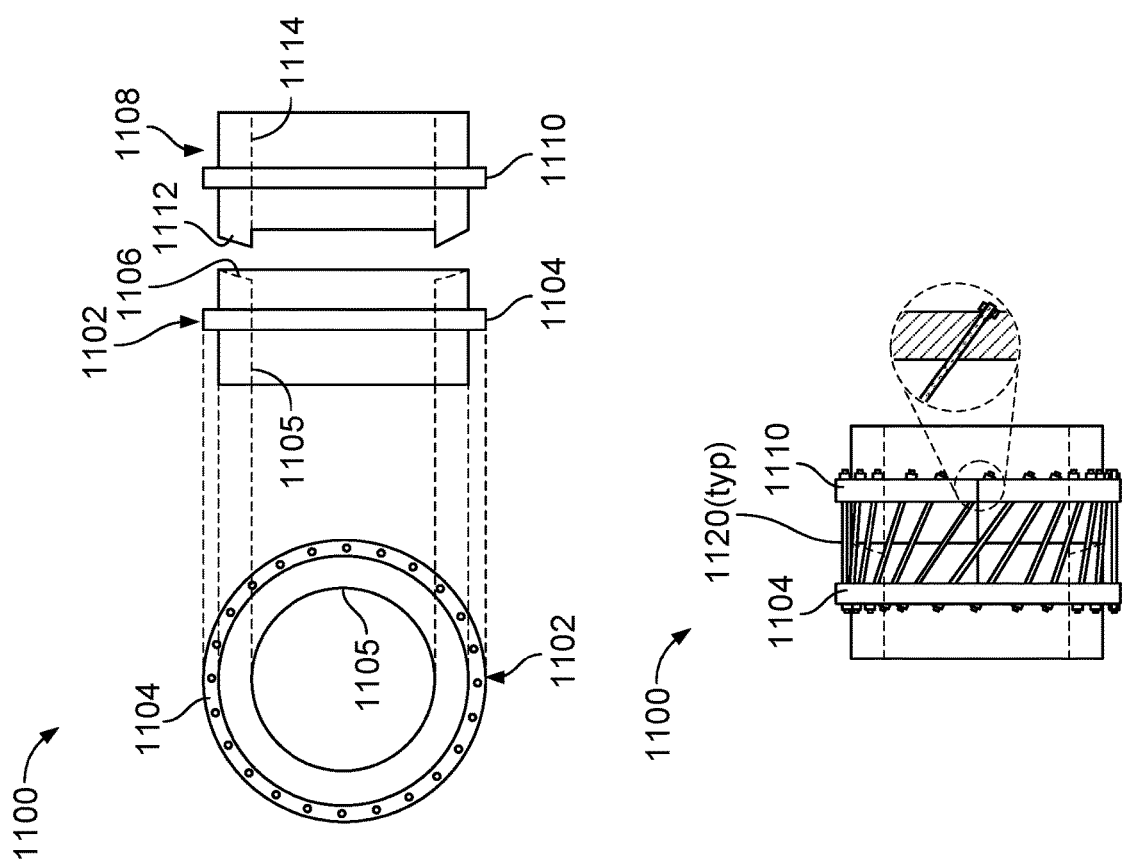

FLEXIBLE CASING SYSTEMS AND METHODS

CROSS-REFERENCE TO RELATED APPLICATIONS

This application is a National Phase Application under 35 U.S.C. § 371 of International Application No. PCT/US2021/055448, filed on Oct. 18, 2021, which claims priority to U.S. Provisional Patent Application 63/144,832, filed on Feb. 2, 2021, and U.S. Provisional Patent Application 63/093,125, filed on Oct. 16, 2020. The contents of all prior applications are incorporated herein by reference in their entireties.

TECHNICAL FIELD

This disclosure relates to flexible casing systems and methods and, more particularly, flexible casing systems and methods that can be used in hazardous waste repositories that use directional drillholes for storing hazardous waste, such as nuclear waste, in a subterranean formation.

BACKGROUND

Hazardous waste is often placed in long-term, permanent, or semi-permanent storage so as to prevent health issues among a population living near the stored waste. Such hazardous waste storage is often challenging, for example, in terms of storage location identification and surety of containment. For instance, the safe storage of nuclear waste (e.g., spent nuclear fuel, whether from commercial power reactors, test reactors, or even military waste) is considered to be one of the outstanding challenges of energy technology. Safe storage of the long-lived radioactive waste is a major impediment to the adoption of nuclear power in the United States and around the world. Conventional waste storage methods have emphasized the use of tunnels, and is exemplified by the design of the Yucca Mountain storage facility. Other techniques include boreholes, including vertical boreholes, drilled into crystalline basement rock. Other conventional techniques include forming a tunnel with boreholes emanating from the walls of the tunnel in shallow formations to allow human access.

SUMMARY

In an example implementation, a casing joint includes a tubular including a particular length, a particular diameter, and a first wall thickness; a male connection formed on a first end of the tubular, the male connection including an axial length and a plurality of threads formed on a portion of an external surface of the male connection less than the axial length of the male connection; and a female connection formed on a second end of the tubular opposite the first end, the female connection including an axial length and a plurality of threads formed on a portion of an internal surface of the female connection less than the axial length of the female connection.

In an aspect combinable with the example implementation, the male connection includes a second wall thickness less than or equal to the first wall thickness.

In another aspect combinable with any of the previous aspects, the female connection includes a third wall thickness less than or equal to the first wall thickness.

In another aspect combinable with any of the previous aspects, the second and third wall thicknesses are equal or substantially equal.

In another aspect combinable with any of the previous aspects, the axial length of the male connection and the axial length of the female connection are equal or substantially equal.

In another aspect combinable with any of the previous aspects, the male connection further includes a non-threaded surface formed on another portion of the external surface of the male connection less than the axial length of the male connection and separate from the portion of the external surface of the male connection that includes the plurality of threads.

In another aspect combinable with any of the previous aspects, the portion of the external surface of the male connection that includes the plurality of threads is at an end of the first end of the tubular, and the non-threaded surface formed on the another portion of the external surface of the male connection is between the plurality of threads and the second end of the tubular.

In another aspect combinable with any of the previous aspects, the female connection further includes a non-threaded surface formed on another portion of the internal surface of the female connection less than the axial length of the female connection and separate from the portion of the internal surface of the female connection that includes the plurality of threads.

In another aspect combinable with any of the previous aspects, the portion of the internal surface of the female connection that includes the plurality of threads is at an end of the second end of the tubular, and the non-threaded surface formed on the another portion of the internal surface of the female connection is between the plurality of threads and the first end of the tubular.

In another aspect combinable with any of the previous aspects, the male connection includes one or more slots formed on a axial surface of the male connection.

In another aspect combinable with any of the previous aspects, the female connection includes one or more pegs formed on a axial surface of the female connection.

In another aspect combinable with any of the previous aspects, the male connection includes one or more slots formed on a first axial surface of the male connection and one or more pegs formed on a second axial surface of the male connection.

In another aspect combinable with any of the previous aspects, the female connection includes one or more pegs formed on a first axial surface of the female connection and one or more slots formed on a second axial surface of the female connection.

In another example implementation, a flexible casing connection includes a first casing joint that includes a first tubular, a first male connection formed on a first end of the first tubular, the first male connection including an axial length and a plurality of threads formed on a first portion of an external surface of the first male connection less than the axial length of the first male connection, and a first female connection formed on a second end of the first tubular opposite the first end, the first female connection including an axial length and a plurality of threads formed on a first portion of an internal surface of the first female connection less than the axial length of the first female connection; and a second casing joint that includes a second tubular including a particular length, a particular diameter, and a second wall thickness, a second male connection formed on a first end of the second tubular, the second male connection including an axial length and a plurality of threads formed on a first portion of an external surface of the second male connection less than the axial length of the second male connection, and a second female connection formed on a second end of the second tubular opposite the first end, the second female connection including an axial length and a plurality of threads formed on a first portion of an internal surface of the second female connection less than the axial length of the second female connection. The plurality of threads of the second female connection are configured to rotate through the plurality of threads of the first male connection to be adjacent a second portion of the external surface of the first male connection exclusive of the first portion of the external surface of the first male connection.

An aspect combinable with the example implementation further including a sleeve positioned over a portion of each of the first male connection and the second female connection and a radial gap between the first male connection and the second female connection.

In another aspect combinable with any of the previous aspects, the flexible casing connection includes a bend of up to 3° between the first casing joint and the second casing joint based on the plurality of threads of the second female connection adjacent the second portion of the external surface of the first male connection exclusive of the first portion of the external surface of the first male connection.

In another aspect combinable with any of the previous aspects, the first male connection includes one or more pegs formed on an axial surface of the first end of the first tubular, and the second female connection includes one or more slots formed on an axial surface of the second end of the second tubular that are configured to engage with the one or more pegs.

In another aspect combinable with any of the previous aspects, each of the one or more pegs includes a rectangular cross-section.

In another aspect combinable with any of the previous aspects, the one or more pegs includes four pegs, and the one or more slots includes four slots.

In another aspect combinable with any of the previous aspects, the second portion of the external surface of the first male connection is free of any of the plurality of threads of the first male connection.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIGS. 11A-11B are schematic illustrations of cross-sectional views of a flexible joint that can facilitate a flexible casing string that can be used in a hazardous material repository according to the present disclosure.

DETAILED DESCRIPTION

The present disclosure describes example implementations of a flexible casing system (or "string") that can be used in a hazardous waste repository, which includes one or more drillholes formed into a subterranean zone to provide long-term (e.g., tens, hundreds, or even thousands of years) storage of hazardous material (e.g., biological, chemical, nuclear, or otherwise) in one or more underground storage volumes storage canisters. The subterranean zone can include multiple subterranean layers having different geological formations and properties. The storage canisters may be deposited in a particular subterranean layer based on one or more geologic properties of that layer. In alternative implementations, however, the example flexible casing strings described herein can be used in wellbores that are primarily (or only) used for the production of hydrocarbons fluids.

Figure 1:
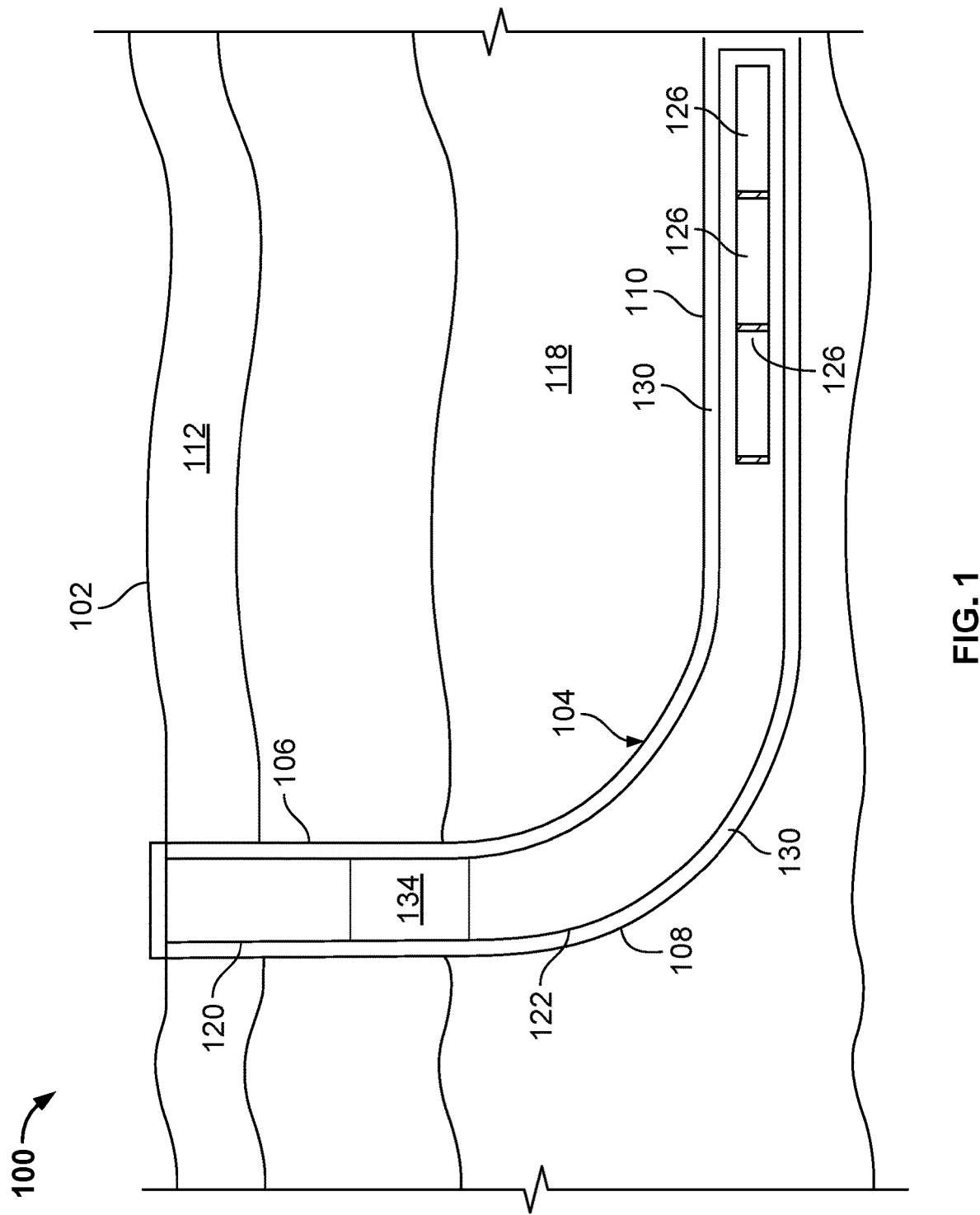
FIG. 1 is a schematic illustration of an example implementation of a hazardous material repository according to the present disclosure.

FIG. 1 is a schematic illustration of an example implementation of a hazardous waste repository 100, e.g., a subterranean location for the long-term (e.g., tens, hundreds, or thousands of years or more) but retrievable safe and secure storage of hazardous material. As illustrated, the hazardous waste repository 100 includes a drillhole 104 formed (e.g., drilled or otherwise) from a terranean surface 102 and through, e.g., multiple subterranean layers to land in subterranean formation layer 118. Although the terranean surface 102 is illustrated as a land surface, terranean surface 102 may be a sub-sea or other underwater surface, such as a lake or an ocean floor or other surface under a body of water. Thus, the present disclosure contemplates that the drillhole 104 may be formed under a body of water from a drilling location on or proximate the body of water.

The illustrated drillhole 104 is a directional drillhole (e.g., wellbore, borehole) in this example of hazardous waste repository 100. For instance, the drillhole 104 includes a substantially vertical portion 106 coupled to a radiused or curved portion 108, which in turn is coupled to a substantially horizontal portion 110. As used in the present disclosure, "substantially" in the context of a drillhole orientation, refers to drillholes that may not be exactly vertical (e.g., exactly perpendicular to the terranean surface 102) or exactly horizontal (e.g., exactly parallel to the terranean surface 102). In other words, those of ordinary skill in the drill arts would recognize that vertical drillholes often undulate offset from a true vertical direction, that they might be drilled at an angle that deviates from true vertical, and horizontal drillholes often undulate offset from a true horizontal direction. Further, the substantially horizontal portion 110, in some aspects, may be a slant drillhole or other directional drillhole that is oriented between exactly vertical and exactly horizontal. Further, the substantially horizontal portion 110, in some aspects, may be a slant drillhole or other directional well bore that is oriented to follow the slant of the formation. As illustrated in this example, the three portions of the drillhole 104—the vertical portion 106, the radiused portion 108, and the horizontal portion 110—form a continuous drillhole 104 that extends into the Earth. Other example drillholes can include vertical or slant drillholes.

The illustrated drillhole 104 has a surface casing 120 positioned and set around the drillhole 104 from the terranean surface 102 into a particular depth in the Earth. For example, the surface casing 120 may be a relatively large-diameter tubular member (or string of members) set (e.g., cemented) around the drillhole 104 in a shallow formation. As used herein, "tubular" may refer to a member that has a circular cross-section, elliptical cross-section, or other shaped cross-section. For example, in this implementation of the hazardous waste repository 100, the surface casing 120 extends from the terranean surface through a surface layer 112. The surface layer 112, in this example, is a geologic layer comprised of one or more layered rock formations. In some aspects, the surface layer 112 in this example may or may not include freshwater aquifers, salt water or brine sources, or other sources of mobile water (e.g., water that moves through a geologic formation). In some aspects, the surface casing 112 may isolate the drillhole 104 from such mobile water, and may also provide a hanging location for other casing strings to be installed in the drillhole 104. Further, although not shown, a conductor casing may be set above the surface casing 112 (e.g., between the surface casing 112 and the surface 102 and within the surface layer 112) to prevent drilling fluids from escaping into the surface layer 112.

As illustrated, a production casing 122 is positioned and set within the drillhole 104 downhole of the surface casing 120. Although termed a "production" casing, in this example, the casing 122 may or may not have been subject to hydrocarbon production operations. Thus, the casing 122 refers to and includes any form of tubular member that is set (e.g., cemented) in the drillhole 104 downhole of the surface casing 120. In some examples of the hazardous waste repository 100, the production casing 122 may begin at an end of the radiused portion 108 and extend throughout the substantially horizontal portion 110. The casing 122 could also extend into the radiused portion 108 and into the vertical portion 106.

As shown, cement 130 is positioned (e.g., pumped) around the casings 120 and 122 in an annulus between the casings 120 and 122 and the drillhole 104. The cement 130, for example, may secure the casings 120 and 122 (and any other casings or liners of the drillhole 104) through the subterranean layers under the terranean surface 102. In some aspects, the cement 130 may be installed along the entire length of the casings (e.g., casings 120 and 122 and any other casings), or the cement 130 could be used along certain portions of the casings if adequate for a particular drillhole 104. The cement 130 can also provide an additional layer of confinement for the hazardous material in canisters 126.

The drillhole 104 and associated casings 120 and 122 may be formed with various example dimensions and at various example depths (e.g., true vertical depth, or TVD). For instance, a conductor casing (not shown) may extend down to about 120 feet TVD, with a diameter of between about 28 in. and 60 in. The surface casing 120 may extend down to about 2500 feet TVD, with a diameter of between about 22 in. and 48 in. An intermediate casing (not shown) between the surface casing 120 and production casing 122 may extend down to about 8000 feet TVD, with a diameter of between about 16 in. and 36 in. The production casing 122 may extend substantially horizontally (e.g., to case the substantially horizontal portion 110) with a diameter of between about 11 in. and 22 in. The foregoing dimensions are merely provided as examples and other dimensions (e.g., diameters, TVDs, lengths) are contemplated by the present disclosure. For example, diameters and TVDs may depend on the particular geological composition of one or more of the multiple subterranean layers, particular drilling techniques, as well as a size, shape, or design of a hazardous material canister 126 that contains hazardous material to be deposited in the hazardous waste repository 100. In some alternative examples, the production casing 122 (or other casing in the drillhole 104) could be circular in cross-section, elliptical in cross-section, or some other shape.

As illustrated, the drillhole 104 extends through subterranean layers and lands in subterranean layer 118. As discussed above, the surface layer 112 may or may not include mobile water. The layer 112 (or a layer beneath the surface layer) can include one or more sources of mobile water, such as freshwater aquifers, salt water or brine, or other source of mobile water. In this example of hazardous waste repository 100, mobile water may be water that moves through a subterranean layer based on a pressure differential across all or a part of the subterranean layer. Examples of rock formations that can include mobile water include porous sandstones and limestones, among other formations.

The storage layer 118, in this example, may be chosen as the landing for the substantially horizontal portion 110, which stores the hazardous material, for several reasons. The storage layer 118 may be thick, e.g., between about 100 and 200 feet of total vertical thickness. Thickness of the storage layer 118 may allow for easier landing and directional drilling, thereby allowing the substantially horizontal portion 110 to be readily emplaced within the storage layer 118 during constructions (e.g., drilling). In some aspects, the storage layer 118 may have sufficient ductility. In some examples implementations of the hazardous waste repository 100, the storage layer 118 is composed of shale. However, other geologic formations, such as salt, a crystalline basement rock, or other formations can be appropriate as well.

As shown in FIG. 1, one or more hazardous material canisters 126 are positioned in the substantially horizontal portion 110 of the drillhole 104. A seal 134 can be placed in the drillhole 104 between the location of the canisters 126 in the substantially horizontal portion 110 and an opening of the substantially vertical portion 106 at the terranean surface 102 (e.g., a well head). In this example, the seal 134 is placed at an uphole end of the substantially vertical portion 108. Alternatively, the seal 134 may be positioned at another location within the substantially vertical portion 106, in the radiused portion 108, or even within the substantially horizontal portion 110 uphole of the canisters 126. In some aspects, the seal 134 may be placed at least deeper than any source of mobile water. In some aspects, the seal 134 may be formed substantially along an entire length of the substantially vertical portion 106.

As illustrated, the seal 134 fluidly isolates the volume of the substantially horizontal portion 110 that stores the canisters 126 from the opening of the substantially vertical portion 106 at the terranean surface 102. Thus, any hazardous material (e.g., radioactive material) that does escape the canisters 126 may be sealed (e.g., such that liquid, gas, or solid hazardous material) does not escape the drillhole 104. The seal 134, in some aspects, may be a cement plug or other plug, that is positioned or formed in the drillhole 104. As another example, the seal 134 may be formed from one or more inflatable or otherwise expandable packers positioned in the drillhole 104.

As shown in FIG. 1, multiple portions of casing can be installed in the drillhole 104, including the surface casing 120 and the "production" casing 122. Taken altogether, the casing portions can be collectively referred to as "casing 122" or a "casing string 122." Casing typically comes in 40-foot sections ("joints") that are screwed (i.e., threaded) together into a casing string that is lowered into the wellbore. Part of the function of the drilling rig is to hold the casing string while a new casing joint is threaded into the last casing joint in the string.

Casing provides several valuable features for a hydrocarbon production well. The casing is typically made thick enough to withstand hydrostatic pressure at depth; that allows lower pressure gas and oil to flow out without the wellbore collapsing. The casing provides a physical protection against rock falls into the wellbore. The casing prevents gas and oil within the wellbore from seeping into the surrounding rock formation (e.g., subterranean zone). The casing prevents water and brine, which is typically entrained in the host rock formations from mixing into the oil or gas flowing through the wellbore. The casing also provides a smooth surface that can facilitate the movement of instruments and logging equipment through the wellbore.

In some situations for hydrocarbon wellbores, it is necessary to drill a large-diameter hole and to place in that hole a similarly large diameter casing within. This is not difficult to do for vertical (or substantially vertical) wellbores, but if the wellbore is curved (or otherwise deviated from vertical) by directional drilling, then the casing string must bend around the curves. For a small-diameter wellbore, such bending is largely routine. In horizontal wells drilled for recovery of gas and oil (e.g., from thick shale layers), the curved section of the wellbore and casing can have a radius of curvature of 700 feet, meaning that the casing string is curving at a rate of about 8° per 100 feet of casing string. Such curvature may not be difficult for a small 4" to 8" diameter casing. As the casing string is lowered into the wellbore, the weight of an upper portion (e.g., near the surface) of the casing string pushes a lower portion of the casing string within the wellbore against the walls of the curved wellbore portion, and the force of the walls bends the casing.

But for larger casings (e.g., >8"), such curvature can become extremely difficult. In the drilling industry, the rule of "D-to-the-fourth" law ($D^4$) applies. This rule implies that the force required to bend a casing joint or string depends on the diameter of the casing to the fourth power. (This law is a consequence, in part, of the fact that a larger casing must typically have a thickness proportional to the diameter to be stable against hydraulic collapse.) As an example of the $D^4$ law, compare the force required to bend a 16-inch diameter casing to that required to bend an 8-inch diameter casing. The ratio of diameters is 2, so the force required for the larger diameter casing is $2^4=16$ times as much force to bend around the same angle. A 32-inch diameter casing is four times the diameter of an 8-inch casing, so the 32-inch casing requires $4^4=256$ times as much force. Because of this large force, large casing is typically curved at much slower rates, such as 1° per hundred feet. However, such slow turns result in an extremely large radius of curvature. For example, 1° per hundred feet implies 9000 feet of casing to turn 90°, and that requires a radius of curvature of 5730 feet. Thus, a horizontal wellbore cannot be achieved from a vertical hole unless the horizontal section is very deep. Slanted rigs can be used to reduce that depth, but they typically are more expensive and harder to use. This approach also suffers from the fact that a slanted casing does not put all of its weight on the bottom segment, so the force available to bend it is reduced.

Implementations of a flexible casing connection according to the present disclosure may be used in a human-unoccupiable directional drillhole (such as drillhole 104) formed from a terranean surface to a subterranean formation (e.g., shale, salt, or otherwise) that include a hazardous waste repository area within the drillhole (such as the implementation of hazardous waste repository 100 shown in FIG. 1). As described, hazardous waste, such as radioactive waste (e.g., spent nuclear fuel, high level radioactive waste, radioactive water, TransURanic (TRU) waste, military weapons grade nuclear waste, and other waste) can be enclosed in one or more hazardous waste canisters 126 (or not) and emplaced (e.g., for interim storage or permanent storage) in a hazardous waste repository area of the drillhole portion 110 (e.g., at a distal end opposite the curved portion 108). In some aspects, a desired depth of the repository area may be typically 1 to 1.5 km (3280 to 4921 feet). Such deep directional drillholes have the vertical depth to allow 1° per 100 feet and thus achieve a horizontal (or substantially horizontal) orientation. However, in alternative aspects, the ideal depth for a repository is not that deep. For example, based on certain geologic characteristics of certain subterranean formations (that can be the storage layer 118), a repository at a depth of approximately 2150 feet (655 meters) can be appropriate. Such shallower subterranean formations (i.e., closer to the surface) can be too shallow to allow a large diameter casing (e.g., 32-inch diameter casing) to achieve a horizontal section. Yet, in some aspects, it may be desirable to enclose the hazardous waste material in a canister that can only fit through a drillhole with such diameter (or larger).

Implementations of a flexible casing connection according to the present disclosure may, therefore, require a smaller magnitude "bending" force as compared to conventional casing (of equal diameter). Such implementations may address two different aspects. The first aspect is one in which the casing joints do not provide fluid isolation from the surrounding formation that would be required, for example, in oil and gas extraction. However, this configuration can prove adequate in other applications that do not require isolation of the interior of the casing from the fluids and gases of the surrounding rock formation. An example of this is the disposal of hazardous waste in a drillhole repository as described. The second aspect is when fluid and gas isolation from the surrounding rock is deemed necessary. Implementations according to the present disclosure may include one or more flexible sleeves in addition to the flexible joint that can allow the flexible casing connection to achieve the required isolation.

In example implementations according the present disclosure, a flexible casing connection allows a particular angle (e.g., 3° angle) between adjacent casing joints in the casing string 122. If the casing joints are 40-feet long, then there can be a change in direction of, e.g., 3° per 40 feet, equal to a rate of change of 7.5° per 100 feet. To turn such a casing string horizontal would require 90/7.5=12 joints and have a length of 40×12=480 feet, and a radius of curvature of 480×2/π=306 feet. Thus, the use of a casing string 122 that includes the flexible casing connections would allow a vertical borehole with 32-inch diameter to turn to a horizontal orientation over a depth change of only 306 feet. This capability would allow large diameter horizontal drillholes to be drilled in the relatively shallow formations, such as the salt formation at the WIPP facility in New Mexico.

In some aspects, a flexible casing connection that is not "fluid tight," (that is, may not prevent the transfer of fluids and gases from the outside of the casing string 122 to the inside of the casing string 122, or vice versa) is described. Such sealing may not be necessary for a hazardous waste disposal repository, e.g., if it is the geology and not the casing that provides the long-term isolation from a biosphere or source of mobile water.

Figure 2A:
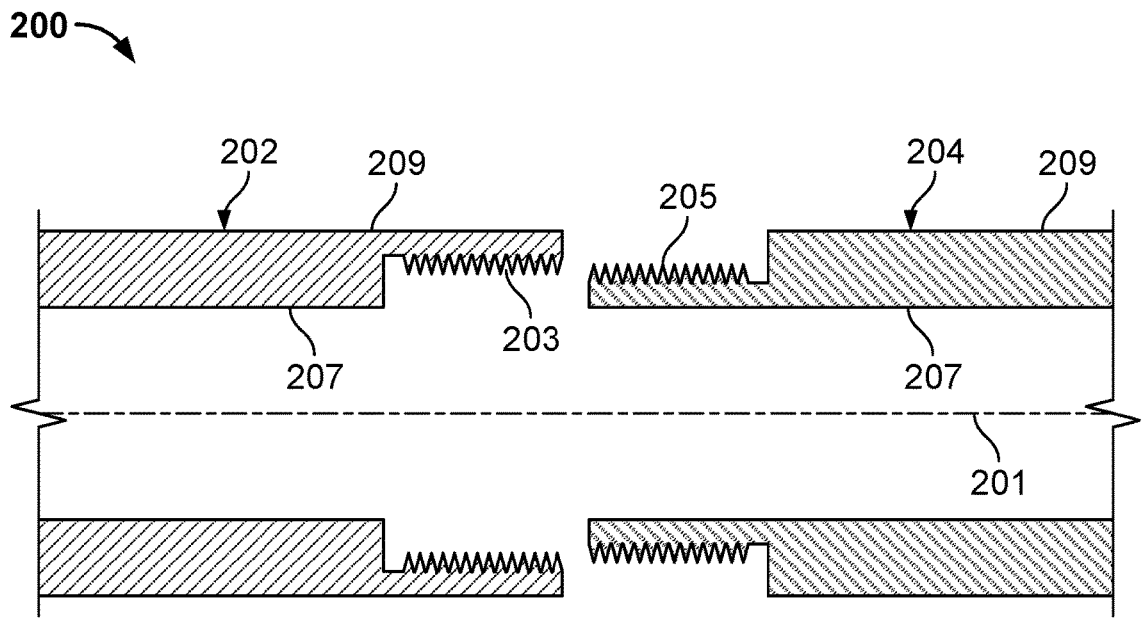
FIGS. 2A-2B are schematic illustrations of a cross-sectional view of a portion of a rigid casing string that can be used in a hazardous material repository according to the present disclosure.
Figure 2B:
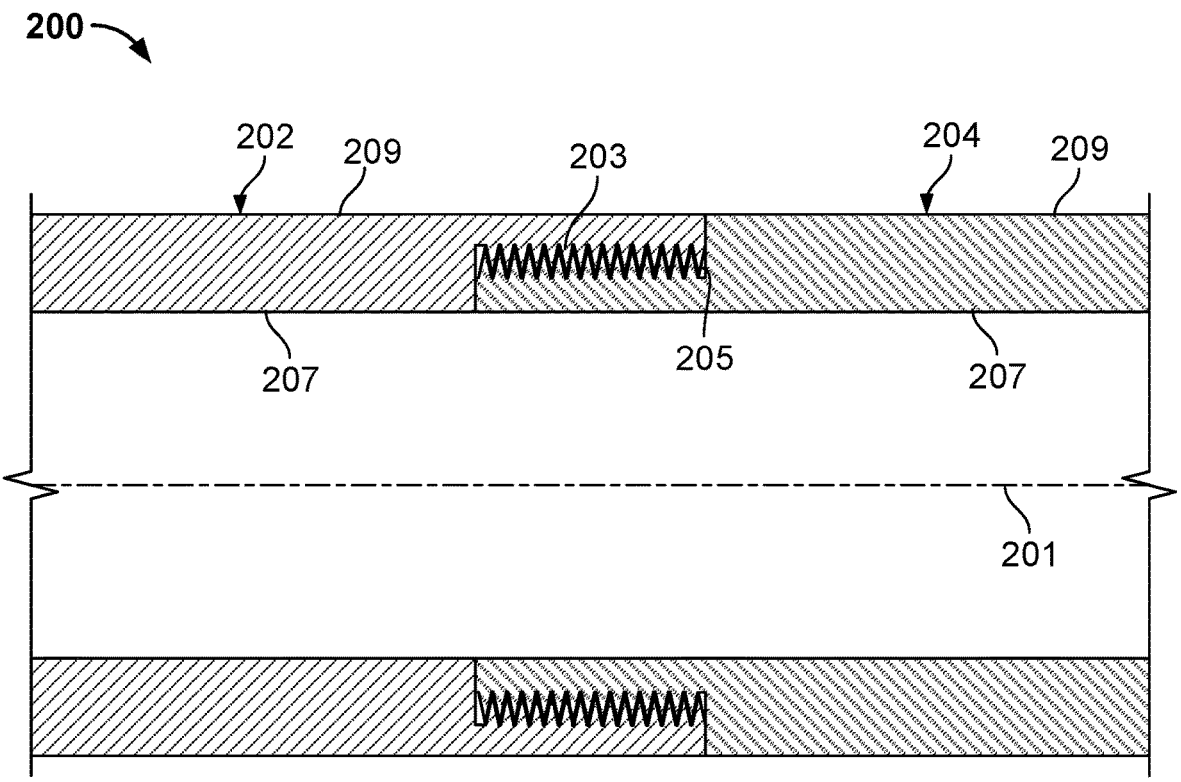

FIGS. 2A-2B are schematic illustrations of a cross-sectional view of a portion of a rigid casing string 200 that can be used in a hazardous material repository or for the production of hydrocarbon fluids. In these figures, female casing joint 202 includes a female thread 203, while male casing joint 204 includes a male thread 205. Both casing joints 202 and 204 include an inner surface 207 and an outer surface 209. Only the mating ends of the casing joints 202 and 204 are depicted in these figures. For a 32-inch diameter casing, the casing thickness would be about 1-inch. The threads 203 and 205 are illustrated schematically. The two casing joints 202 and 204 can be connected by using relative rotation around an axis of symmetry 201 to thread them together. More specifically, each 40-foot long casing section 202 and 204 is threaded at both ends, with one end threaded in a male and one in a female form. FIGS. 2A-2B are shown with a horizontal orientation, but installed in a directional drillhole, are vertically oriented and then can turn horizontally. On the rig, for example, the female casing joint 202 can support all of the casing string that is below (i.e., downhole), while the male casing joint 204 is then screwed into the female casing joint 202.

Notably, since each casing joint has both a male connection and a female connection, the male casing joint 204 refers to the male connection end of casing joint 204, which would also have a female connection end opposite the male connection end that is the same as the female casing joint 202. Likewise, the female casing joint 202 refers to the female connection end of casing joint 202, which would also have a male connection end opposite the female connection end that is the same as the male casing joint 204.

FIG. 2B shows the casing joints 202 and 204 of FIG. 2A after they have been threaded together, that is, the corresponding threads 203 and 205 are fully engaged. The gaps between the outer surface of the casing joints 202 and 204 are exaggerated; in practice the gaps can be effectively zero. A tight fit between the two joints 202 and 204 helps isolate the fluid and gas from outside of the casing string from a volume within the casing string. When the threads 203 and 205 are fully engaged (as shown in FIG. 2B), support of the casing string 200 is transferred to the male casing joint 204. The fully engaged connection shown in FIG. 2B is not meant to be flexible but instead is a rigid casing joint (that facilitates a rigid casing string 200); the engaged connection is meant to isolate the interior of the casing string 200 from the exterior of the casing string 200 (i.e., adjacent the subterranean formation).

Figure 3A:
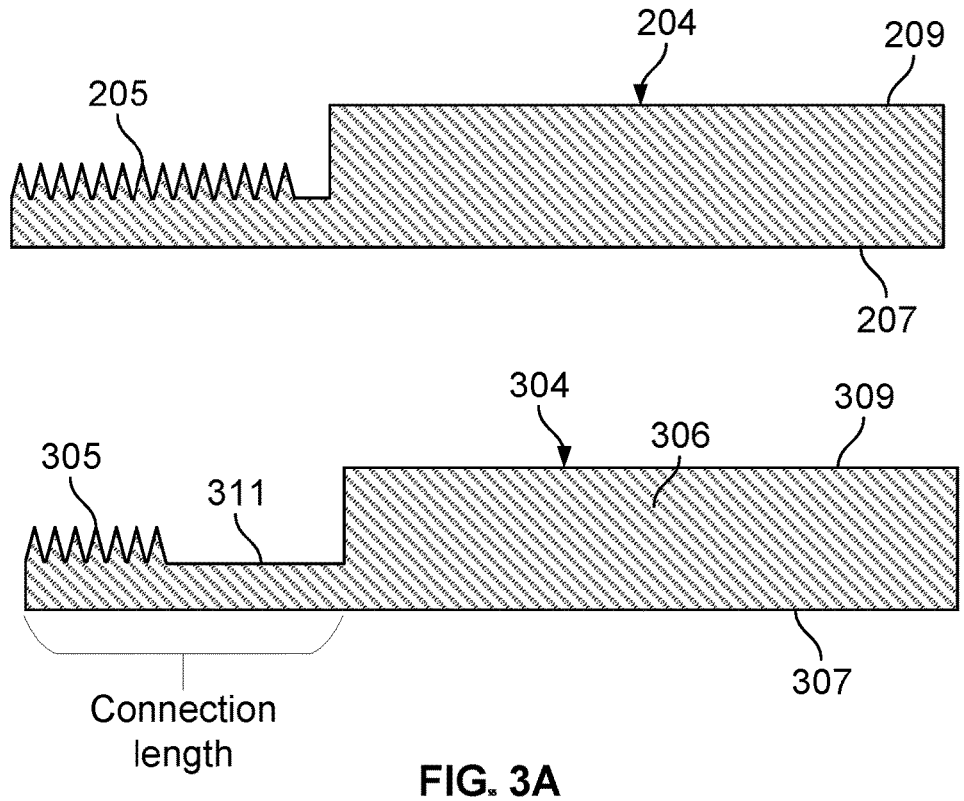
FIG. 3A is a schematic illustration of cross-sectional views of portions of casing joints that can be used in a rigid casing string or a flexible casing string according to the present disclosure.

FIG. 3A is a schematic illustration of cross-sectional views of portions of casing joints that can be used in a rigid casing string or a flexible casing string according to the present disclosure. More specifically, FIG. 3A shows the male casing joint 204 from FIG. 2A that makes up a rigid casing joint, as well as a male casing joint 304 that can make up a flexible casing joint. As illustrated, the male casing joint 304 includes a threaded portion 305 and an unthreaded portion 311 of the male "end," as well as an outer surface 309 and an inner surface 307. Thus, as shown, a portion of threads of the male connection section have been removed. These male and female connection sections can be threaded together, much as the conventional casings are threaded together.

Figure 3B:
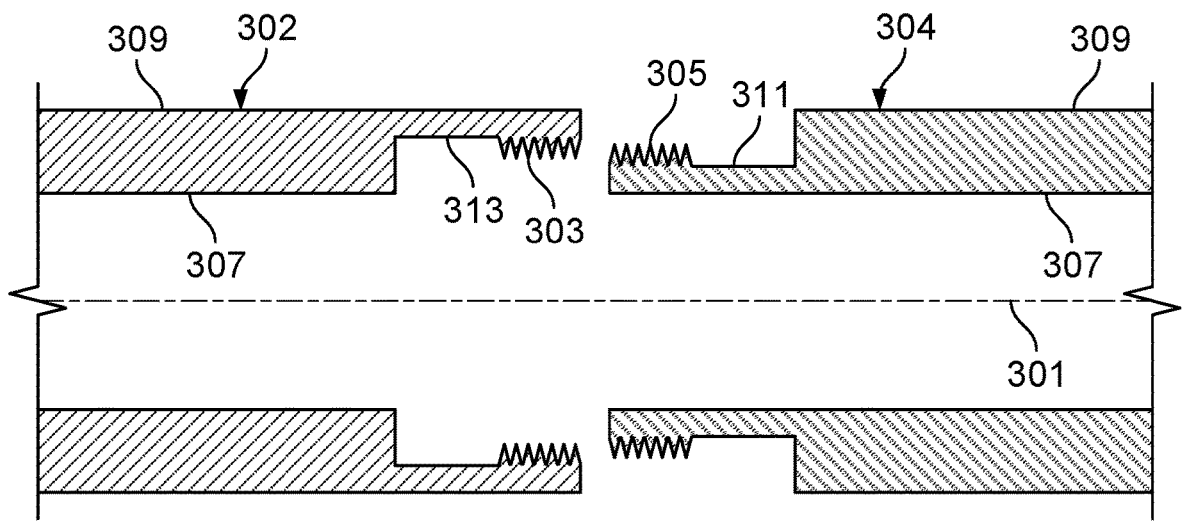
FIGS. 3B-3G are schematic illustrations of a cross-sectional view of a portion of example implementations of a flexible casing string that can be used in a hazardous material repository according to the present disclosure.

The result of a partial threading of the two casing joints (including the male casing joint 304) shown in FIG. 3A is shown in FIG. 3B. A female casing joint 302, with a threaded portion 303 and unthreaded portion 313 (as well as outer surface 309 and inner surface 307), is shown in this figure. Notably, since each casing joint has both a male connection and a female connection, the male casing joint 304 refers to the male connection end of casing joint 304, which would also have a female connection end opposite the male connection end that is the same as the female casing joint 302. Likewise, the female casing joint 302 refers to the female connection end of casing joint 302, which would also have a male connection end opposite the female connection end that is the same as the male casing joint 304. In some aspects, a wall thickness at the unthreaded portions 311 and 313 of casing joints 304 and 302, respectively, is less than a wall thickness of the casing joints 304 and 302 at the tubular portion 306.

Figure 3C:
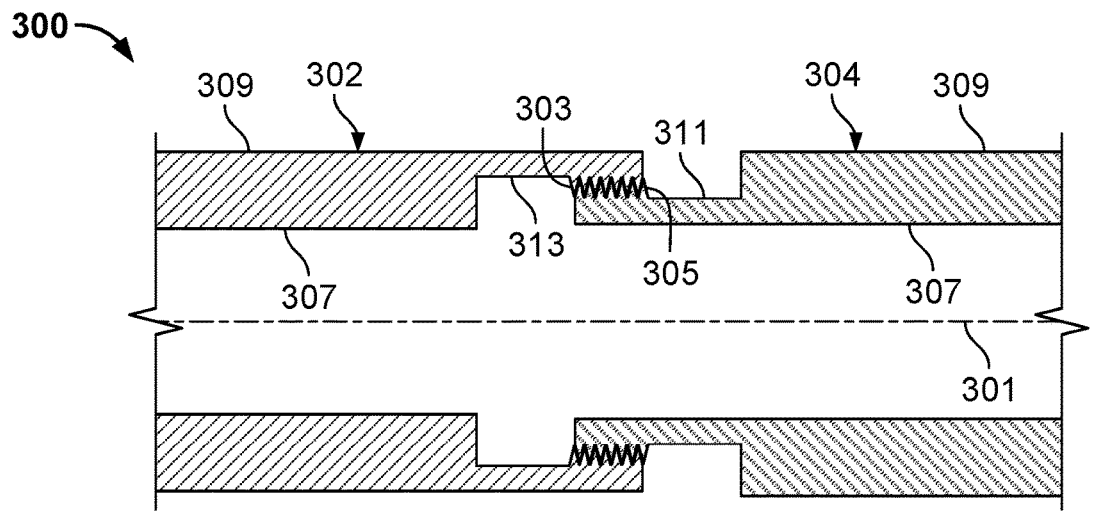

In FIG. 3B, the threads 305 and 303 have not yet been engaged. Turning to FIG. 3C, in this figure, the threads 303 and 305 have been completely engaged, and the male and female "ends" overlap is substantially 100%. When the threads 303 of the female casing joint 302 are completely engaged with the threads 305 of male casing joint 304, the casing joint connection may not be flexible.

However, to achieve the flexibility of the connection between the female casing joint 302 and the male casing joint 304, additional threading rotation is applied until the threaded sections 303 and 305 no longer engage. This is shown in FIG. 3C. Note that in FIG. 3C, the threads of one casing joint are no longer engaged with the threads of the other casing joint. Instead, the threads 303 are adjacent the unthreaded portion 311, and the threads 305 are adjacent the unthreaded portion 313. The connection between the casing joints 302 and 304 is not completely rigid, but allows a small amount of relative motion between the female casing joint 302 and the male casing joint 304. Yet the two casing joints 302 and 304 do not separate, e.g., unless a relative threaded rotation is applied between the two joints 302 and 304. Thus, if the configuration shown in FIG. 3C is vertically oriented, then the lower casing joint will hang from the upper casing joint.

Figure 3D:
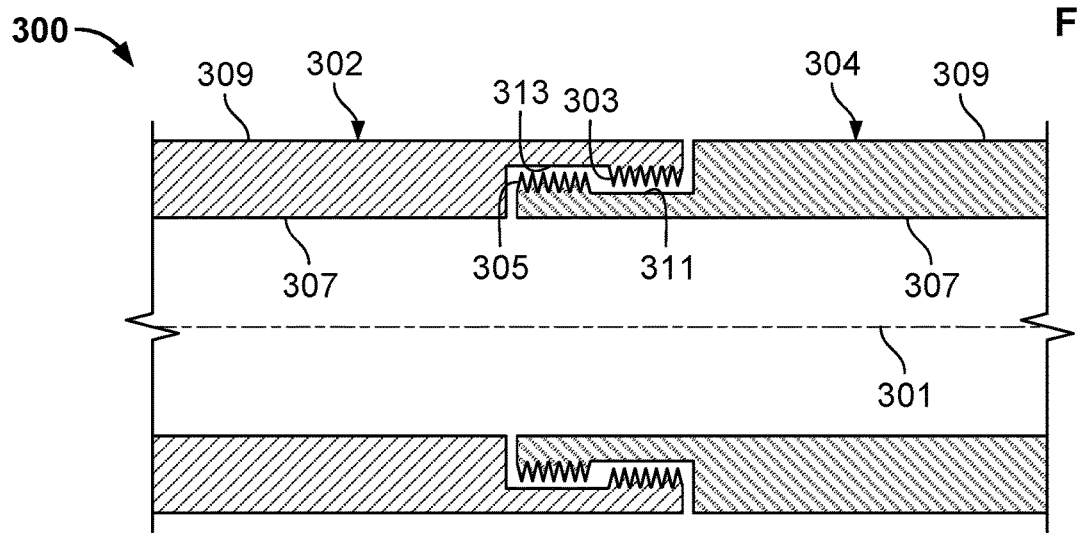
Figure 3E:
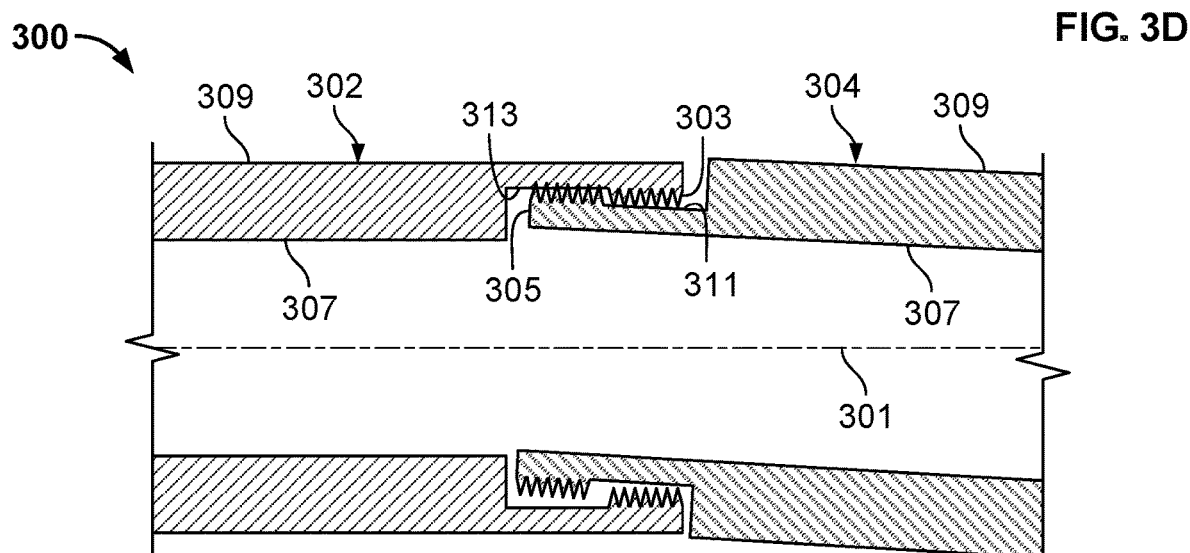

FIG. 3E illustrates the limited flexibility of the flexible casing connection 300 shown in FIG. 3D. The two casing joints 302 and 304 can now be tilted with respect to each other, as shown in FIG. 3D. This figure also shows that the disengagement of the male and female threads 303 and 305, respectively, can result in a leakage path between a space inside the casing string 300 and a space outside the casing string 300. An attempt to bend the joint beyond a small angle (e.g., 3° in FIG. 3E) may require bending of the bulk casing. Once the maximum free angle (e.g., 3° in FIG. 3E) is reached, the casing string 300 may not bend except with significant force.

As stated earlier, a 3° change in direction every 40 feet amounts to a 7.5° change every 100 feet. Twelve such tilts sum to 90°. A casing string with this degree of flexibility could go from vertical to horizontal in a length (along the casing string) of 12×40=480 feet, without putting any bending stress on the casing joints, themselves. Thus, the force to bend them through this angle is very small relative to conventionally required forces to bend a casing string. That 480 feet is the arc length of a circle with a radius of 306 feet. This approach allows a sharp angle for a thick casing without putting any additional stress on the casing.

In some aspects, there is an additional constraint for lowering a casing string down a wellbore without it being bent: the straight casing must fit inside the curved borehole without being wedged between the sides. The additional spacing d needed to assure this is given approximately by $d=L^2/(4R)$ where L=40 feet=length of the casing, and R is the radius of curvature of the hole; R=306 feet in the example above. Substituting into the formula gives d=1.33 feet=1 foot 4-inch gap. Such a large gap is usually considered impractical or prohibitively expensive. This gap can be reduced by allowing R to be larger, and the length of the casing segments to be smaller. If R=71.700 feet, and L=20 feet, then d=0.14 feet=1.7 inches, a reasonable gap. Thus a 32-inch diameter casing would require a 34-inch diameter hole to avoid a bending moment on any casing section. Note that the total required clear space d does not depend on the size of diameter of the casing.

Implementations according to the present disclosure allow for and facilitate many similar geometric designs that would work, because, for example, such implementations provide for a trade-off between flexibility and isolation that is beneficial for some applications (such as a hazardous waste repository formed in a human-unoccupiable, directional drillhole). Implementations of the present disclosure allow a loosening of the casing joint connection in a way that provides connection strength but bend flexibility, at least over a small angle. What is sacrificed in doing this is the tight seal that provides isolation from inside the casing string to outside the casing string.

Although casing joints that provide for a flexible casing connection as described can be newly manufactured, such joints can also be made by modifying traditional casing joints. This is illustrated in FIG. 3A, which compares the male casing joint 204 of a conventional casing, with the male casing joint 304 of a casing joint that provides for a flexible casing connection. The conventional casing of male casing joint 204 can be converted to the male casing joint 304 by removing or milling off part of the threads 205 to create the unthreaded portion 311 as shown.

In many applications, the liquid and gas path that exists in the flexible casing connection 300 may be undesirable or a detriment. For example, in the oil and gas industry, the pathway within the connection could allow oil and gas to leak out of the casing string, or brine or hydrogen sulfide gas to leak into the casing string. Other example implementations of the present disclosure include another flexible casing connection that provides for a fluid seal while still retaining all or much of its flexibility.

Figure 3F:
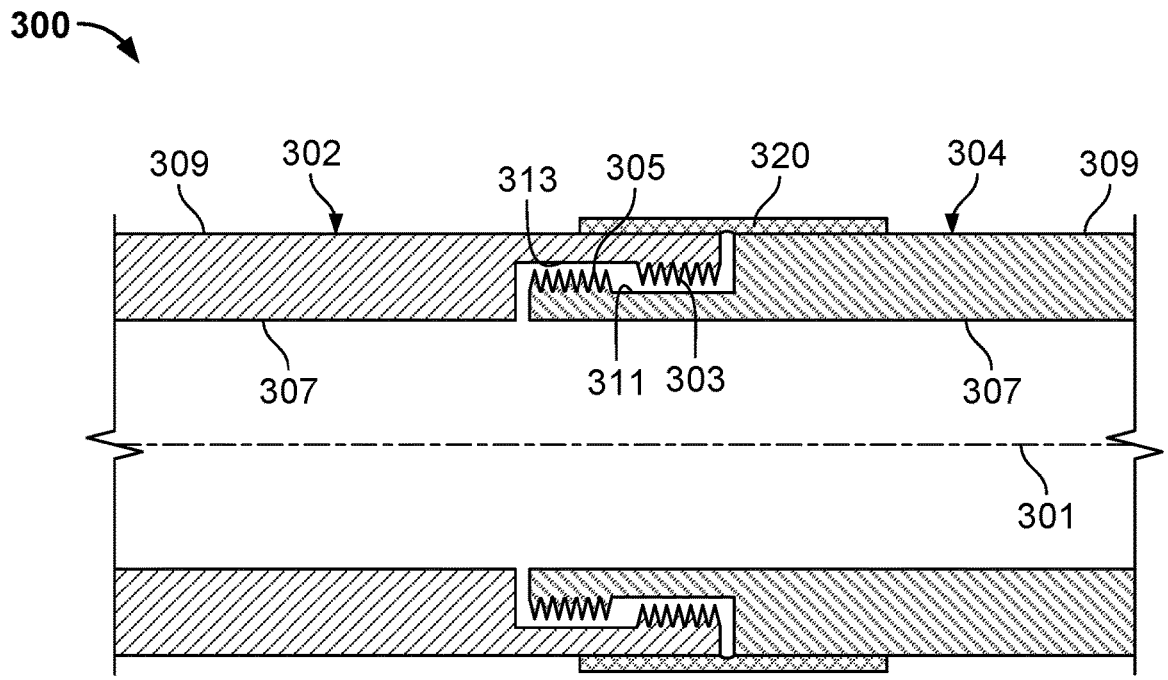
Figure 3G:
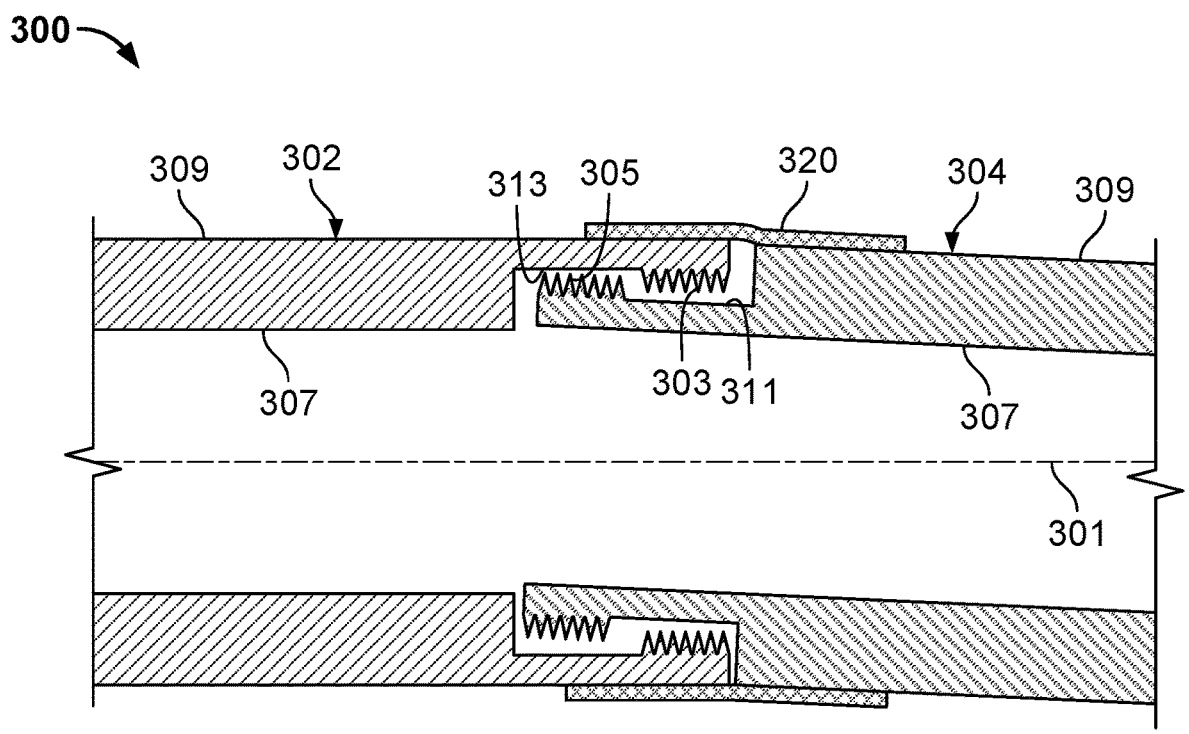

In an example implementation, a sleeve (or strap) 320 is added to the implementation shown in FIG. 3F. The sleeve 320, in some aspects, can be a tube placed on the outside of the casing joint 300 (or joints), or in some cases on the inside, to seal the small gap that prevent fluid isolation. In some aspects, such a sleeve 320, however, may not be always necessary for a casing string for a hazardous waste repository formed in a directional drillhole. FIG. 3G shows an example implementation of a flexible casing connection 300 that includes the sleeve 320 in place when the connection is flexed (e.g., at a 3° angle).

In some cases, to be effective, the sleeve 20 can have a tight (or relatively tight) fit to the casing connection 300, that is, it should not allow gas or liquid to flow easily between it and the casing exterior surface 309. Yet the sleeve 320 can also be capable of accommodating a bend in the flexible casing connection 300 (as previously described). The sleeve 320 can accomplish this by a combination of bending, stretching, and/or slipping. If the pressure outside the casing string 300 is higher than inside (a common condition for oil and gas extraction) then that outside pressure, typically supplied by brine that has leaked from the rock of the host formation, can supply a force that will help seal the sleeve 320 to the casing string 300.

When the casing string 300 is installed with cement, some cement could leak through the opening provided in between the two casing joints 302 and 304. That cement, when it sets, could lock the two casing joints 302 and 304 together. However, if the casing must be removed after cementing, the cement would not be expected to be a strong-enough seal to the casing joints 302 and 304 to prevent the flexing of the flexible casing connection 300. One way to prevent cement from entering the region between the casings is to fill that region with a viscous material, such as a gel, that would not prevent the flexing of the joint, but would impede the flow of cement into the gap.

In some aspects, the sleeve 320 has a smaller diameter than that of the outer surface 309 of the casing joints 302 and 304, stretched to slide it into position, and then released; in this latter case, the sleeve 320 can grip the casing tightly (e.g., as does a rubber band placed around a bottle). Alternatively, the sleeve 320 can be a strap that is tightened once in place. In an example configuration, the sleeve 320 is tight enough to provide fluid isolation between the inside and outside of the casing string 300, but loose enough that the sleeve 320 can slip rather than break if the casing joint 300 is bent through a small angle. In another example configuration, the sleeve 320 is made of a material that is capable of stretching a small amount when the flexible casing connection 300 is flexed. The sleeve 320 can include a single layer, or it could be multiple layers. Alternatively, the sleeve 320 can be heated to expand, placed over the connection at the rig when the casing joint connection is first made; the sleeve 320 can then contract to a snug fit when it cools.

FIG. 3G illustrates the behavior of the sleeve 320 when the flexible casing connection 300 is flexed. As can be seen in FIG. 3G, when the connection is flexed, the sleeve is bent, slips and/or stretched, but continues to keep the inside of the casing isolated from the outside. If the pressure outside the sleeve is greater than it is inside (and this is typically true if the casing is conveying natural gas or oil) then that pressure can help keep the sleeve 320 in tight contact with the casing string 300.

In some aspects, a thickness of the sleeve 320 is much thinner than a thickness of the casing wall of casing joint 300. Since the span is small; for 32-inch casing with a tilt of 3°, the gap size is only 1.7 inches. Such a small gap does not require thick metal to hold the expected pressure difference. An order-of-magnitude estimate is that the sleeve 320 can be thinner than 1 mm and still support a large pressure differential there across.

The flexible casing connection 300 described and illustrated with respect FIGS. 3B to 3G couples the casing joints 302 and 304 and allows a limited range of axial motion of one casing joint with respect to another casing joint. However, in some aspects, these example implementations of the flexible casing connection 300 can allow for rotation (about an axis of rotation 301) of the casing joints 302 and 304 relative to one another (e.g., 360° rotation). In some circumstances, such rotation capability is undesirable. For example, when a casing string is emplaced in a drillhole, an uphole end is often rotated as the casing string descends downhole. Among other effects, this rotation can keep an external surface of the casing string (e.g., that faces a rock formation) in constant motion with respect to that of the sides of the drillhole. Doing so reduces friction, since the coefficient of static friction is typically higher than the coefficient of dynamic friction.

The present disclosure also describes example implementations of a flexible casing connection similar to that of FIGS. 3B-3G but with a modification of the ends of the casing joints that can create a rotational coupling that will achieve the desired effect of reducing or eliminating relative rotation. Thus, a rotating section (i.e., male casing joint 304 in FIG. 3B) can cause the adjacent casing joint (i.e., female casing joint 302 in FIG. 3B) to rotate along with it. In some aspects, this rotational coupling is designed to operate only when the two casing joints are in a compressed configuration (e.g., even though the threads are not engaged, one is pushing on the other). Thus, in some aspects, such rotational coupling may not occur when the two casing joints are being threaded together; indeed, if it did, it would prevent the completion of the threading motion.

Figure 4A:
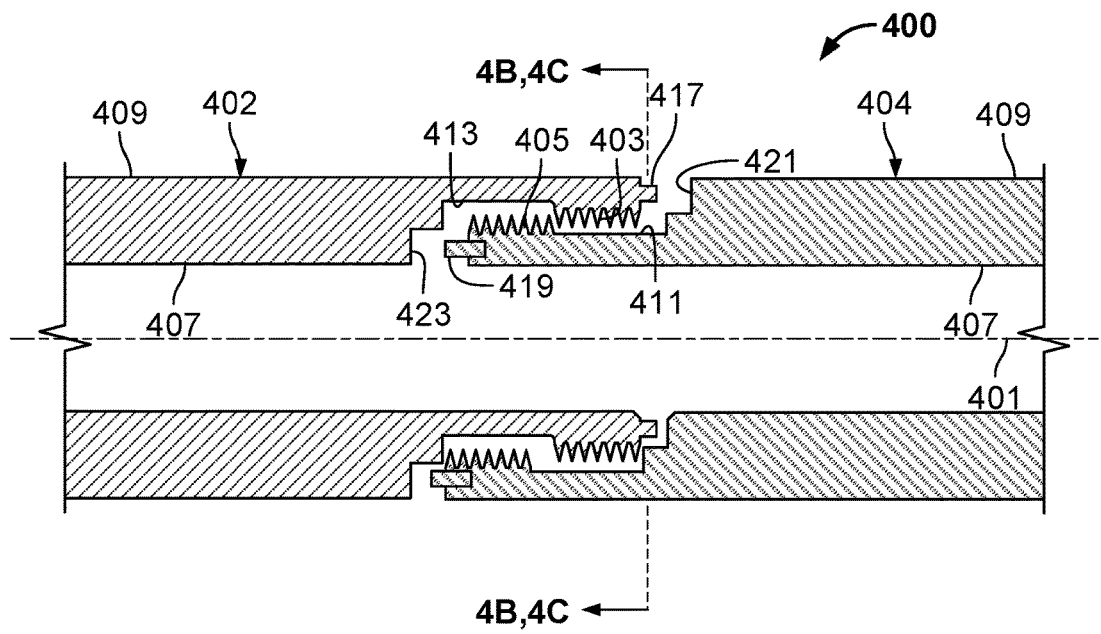
FIGS. 4A-4C are schematic illustrations of cross-sectional views of a portion of another example implementation of a flexible casing string that can be used in a hazardous material repository according to the present disclosure.
Figures 4B, 4C:
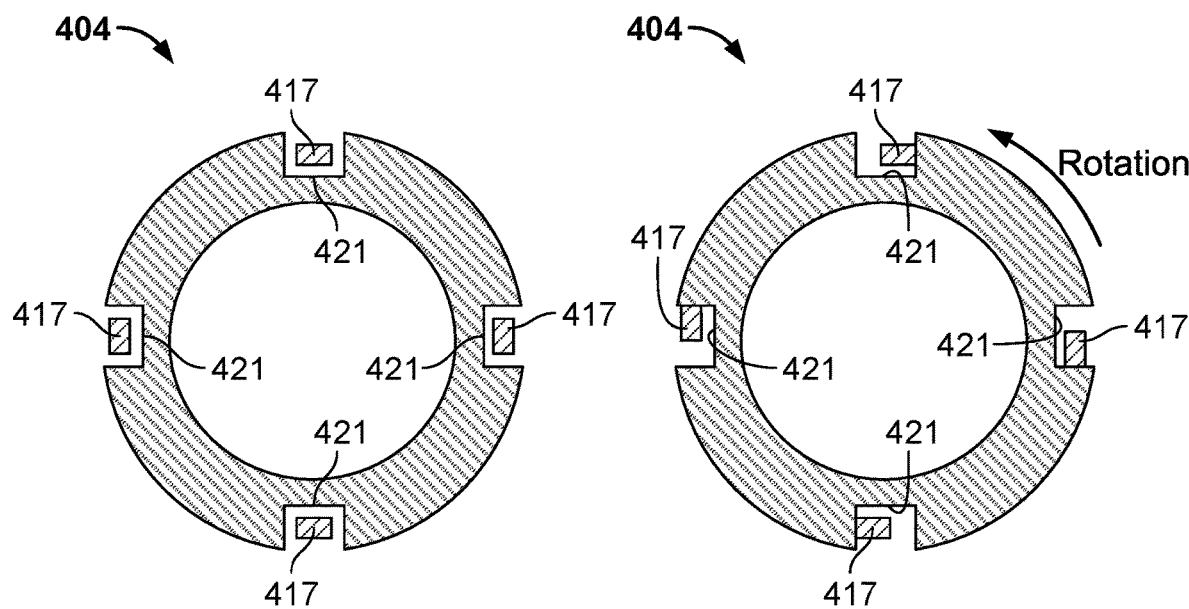

In some aspects, this rotational coupling is achieved by positioning, forming, or integrating one or more pegs and corresponding slots on the ends of the casing joints (e.g., axial faces formed at ends of the casing joints) as they face each other (e.g., are arranged end to end, lengthwise). One example of this configuration is illustrated in FIGS. 4A-4C. In FIG. 4A, a flexible casing connection 400 is shown, which includes a male casing joint 404 having threads 405, an unthreaded portion 411, one or more pegs 419, and one or more slots 421. Flexible casing connection 400 also includes a female casing joint 402 having threads 403, an unthreaded portion 413, one or more pegs 417, and one or more slots 423. FIG. 4A shows an axial cross section of the flexible casing connection 400, while FIGS. 4B-4C show radial cross-sections taken at the dashed line of FIG. 4A. Notably, since each casing joint has both a male connection and a female connection, the male casing joint 404 refers to the male connection end of casing joint 404, which would also have a female connection end opposite the male connection end that is the same as the female casing joint 402. Likewise, the female casing joint 402 refers to the female connection end of casing joint 402, which would also have a male connection end opposite the female connection end that is the same as the male casing joint 404.

FIG. 4A shows an extended configuration of the flexible casing connection 400, in which pegs 419 are not engaged in slots 423 and pegs 417 are not engaged in slots 421 (although the threaded portions 405 and 403 have been engaged and then disengaged to be adjacent to the respective unthreaded portions 413 and 411). This can be encountered when one casing joint is hanging from the other casing joint. FIG. 4B shows a compressed configuration in which pegs 419 are engaged with slots 423 (not shown) and pegs 417 are engaged with slots 421 (shown). This can be encountered when the forward motion of one casing joint is impeded (e.g., by friction with the sides of the drillhole) and the next casing joint is pushing against a previous casing joint.

In the extended configuration, the female casing joint 402 and male casing joint 404 do not have the illustrated pegs engaged with the respective slots, and one casing joint can rotate freely compared to the other. This is the configuration that could occur when both casing joints 402 and 404 are vertical, and one is hanging from the other. Where the casing joints 402 and 404 make significant contact with the sides of the drillhole (e.g., the subterranean formation), there can be sufficient friction to bring the two pieces into the compressed configuration shown in FIG. 4B. In this compressed configuration, the pegs 417 and 419 enter the slots 421 and 423, respectively, and rotation (about an axis of rotation 401) of one of the casing joints can exert a rotational torque on the other casing joint.

A cross-section of the casing joints 402 and 404, when rotated in the compressed configuration with the pegs in the respective slots, is shown in FIG. 4C. Because the pegs 417 are now in the slots 421 (as shown), they can exert a twisting torque as illustrated in FIG. 4C. In FIG. 4B, the pegs 417 do not touch the sides of the slots 421 (in the compressed, but unrotated, configuration) and are not engaged. In FIG. 4C, the pegs 417 engage the sides of the slots 421, due to rotation of the male casing joint 404 and are thus engaged and can transmit a rotational torque on the female casing joint 402 that includes the pegs 417.

The example pegs 417 and 419 can have many shapes, but can have sufficient space around them such that they will not interfere with the bending of the flexible casing connection 400. The number of pegs 417 or 419 can be one or greater; the slots 421 or 423 can be equal to or greater than the number of pegs. In FIGS. 4B-4C, an example is shown with four pegs 417 and an equal number of slots 421. In some aspects, a size (e.g., diameter, length) of the pegs 417 or 419 can be sufficiently large to be able to supply a necessary torque to rotate the casing string 400. The configuration of the slots 421 or 423 can be such that upon rotation, all of the respective pegs will engage the slots. The pegs 417 or 419 need not be rectangular in shape; they might (for example) be curved to match the curvature of the casing.

When the casing joints 402 and 404 go from the uncompressed configuration to the compressed configuration, the pegs 417 and/or 419 may not be aligned with the slots 421 and/or 423, respectively. When one casing joint is rotated, the pegs will eventually match the configuration of the slots, and they can move into those slots. When that happens, a state as shown in FIG. 4B can occur. As one casing joint continues to rotate, the pegs come into contact with the sides of the slots, as shown in FIG. 4C. Continued rotation of one of the casing joints 402 or 404 can then cause rotation of the other of the casing joints 402 or 404, driven by the torque supplied by the pegs.

In some aspects, the slots 421 and/or 423 are formed larger than the pegs 417 and/or 419, respectively, both to ease their entry, and also to avoid any interference with the flexing of the flexible casing connection 400. Thus, the pegs and slots may not be engaged until the threads of the casing joints are disengaged when the casing joints abut 402 and 404 one another, since once they engage, the relative rotation needed to disengage may not be possible.

Implementations of the present disclosure include a flexible casing joint that can be coupled to and isolated from longer casing segment in, for example, a drillhole (or wellbore) for a hazardous waste repository that stores (temporarily or permanently) hazardous waste such as nuclear waste. The implementations of casing joints shown in FIGS. 3A-3G and 4A-4C are modified versions of conventional casing joints (e.g., modified to remove threads, add pegs and slots, or a combination thereof). However, in some aspects of the present disclosure, conventional casing joints can be joined by a stand-alone flexible casing joint to provide for a flexible casing connection without modifying the conventional casing joints. The stand-alone flexible casing joint can couple two conventional casing joints together (e.g., at a rig) such as by performing two threading operations (rather than one as conventionally occurs to join two, threaded casing joints).

Figure 5:
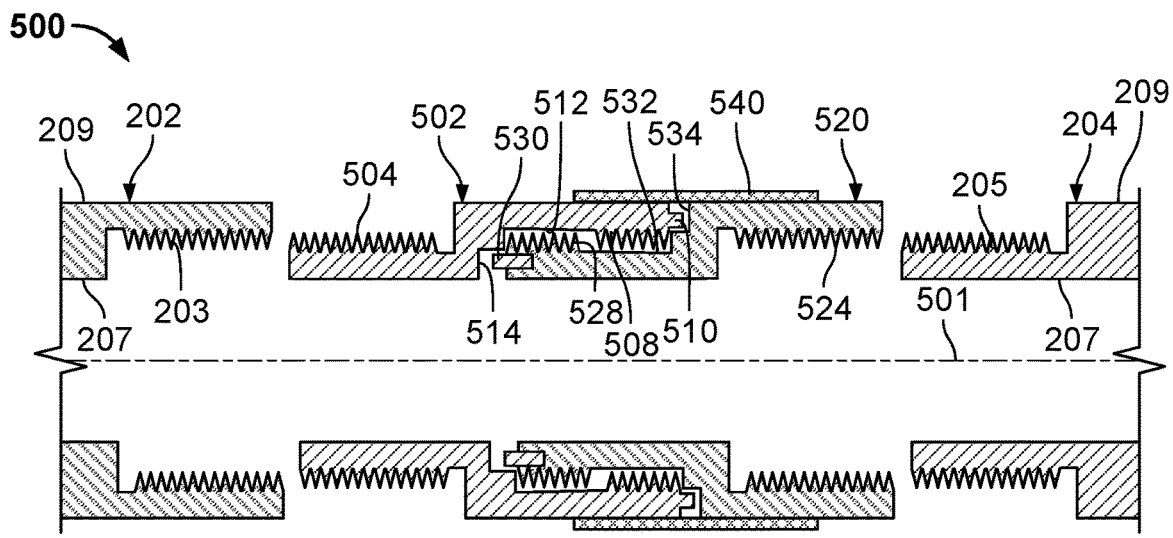
FIG. 5 is a schematic illustration of a cross-sectional view of a portion of another example implementation of a flexible casing string that can be used in a hazardous material repository according to the present disclosure.

FIG. 5 shows an example implementation of a stand-alone flexible casing joint 500 (a pre-fabricated flexible joint) that can be threaded into conventional casing joints 202 and 204 (female casing joint 202 at the left and male casing joint 204 at the right). In the example implementation shown in FIG. 5, concepts for the flexible casing connection as shown in FIGS. 3B-3D are used to make the stand-alone flexible casing joint 500 (e.g., a flexible casing joint that independent of a conventional casing). For example, the stand-alone flexible casing joint 500 of FIG. 5 can connect onto a lower casing on the rig, and then the next casing above could be threaded into the stand-alone flexible casing joint 500. An advantage of this example implementation of the stand-alone flexible casing joint 500 is that it allows the use of unmodified (e.g., conventional) casing joints 202 and 204, as shown.

As shown in this example, the stand-alone flexible casing joint 500 is comprised of a joint section 502 and a joint section 520. The joint section 502 includes inner threads 508 (e.g., threads that are formed on an inner radial surface of the joint section) and outer threads 504 (e.g., threads that are formed on an outer radial surface of the joint section). The inner threads 508 are adjacent an unthreaded portion 512 of the joint section 502. The joint section 520 includes inner threads 524 (e.g., threads that are formed on an inner radial surface of the joint section) and outer threads 528 (e.g., threads that are formed on an outer radial surface of the joint section). The outer threads 528 are adjacent an unthreaded portion 532 of the joint section 520.

The two joint sections 502 and 520 can be connected by using relative rotation around an axis of symmetry 501 to thread them together by threading, e.g., the inner threads 508 of the joint section 502 with the outer threads 528 of joint section 520. The figure is shown with a horizontal orientation, but installed in a drillhole, can be vertically or horizontally oriented.

As illustrated, a portion of the inner threads 508 and a portion of the outer threads 528 have been removed to form unthreaded portions 512 and 532, respectively. These partially threaded surfaces of the joint sections 502 and 520 can be threaded together, much as the conventional casings are threaded together. A partial threading of joint sections 502 and 504 can result in a connection that looks similar to that of FIG. 3B, i.e., the threads 508 and 528 have completely engaged, and the threaded portions overlap connection is substantially 100%. To achieve the flexibility of the stand-alone flexible casing joint 500, additional threading rotation is applied until the outer threads 528 and the inner threads 508 are no longer engaged and are instead positioned across from unthreaded portions 512 and 532, respectively; this is shown in FIG. 5. Note that in FIG. 5, the outer threads 528 are no longer engaged with the inner threads 508. The connection between the joint sections 502 and 520 is not completely rigid, but allows a small amount of relative motion there between. Yet the joint sections 502 and 520 will not separate unless a relative threaded rotation is applied between the two joints. Thus, if the configuration shown in FIG. 5 is vertically oriented, then the stand-alone flexible casing joint 500 will not decouple between joint section 502 and joint section 520, thereby joining female casing joint 202 with male casing joint 204.

FIG. 5 illustrates the joint sections 502 and 520 having been threaded together (and ready to thread to the conventional casing joints 202 and 204 as shown). The gaps between the outer surface of the casing joints are exaggerated; in practice the gaps can be effectively zero. A tight fit between the two joint sections 502 and 520 helps isolate the fluid and gas from outside of the casing string from a volume within the casing string. Although the stand-alone flexible casing joint 500 is shown with a sleeve 540 (which can be like sleeve 320 and that circumscribes a connection location of joint section 502 with joint section 520) that the sleeve 521 is optional. Another advantage of the stand-alone flexible joint 500 is that the sleeve 521 can be installed "off rig" and does not have to be placed in position during rig operations.

In some aspects, as shown in this example, the joint section 502 can include one or more pegs 510 formed on one axial end face along with one or more slots 514 formed on another, opposite axial end face of the section 502. Likewise, the joint section 520 can include one or more pegs 530 formed on one axial end face along with one or more slots 534 formed on another, opposite axial end face of the section 520. As described with reference to FIGS. 4A-4C, the illustrated pegs and slots can interface (when the joint sections 502 and 520 are in a compressed configuration) and prevent substantial rotation of one joint section based on rotation of the other joint section.

Figure 6:
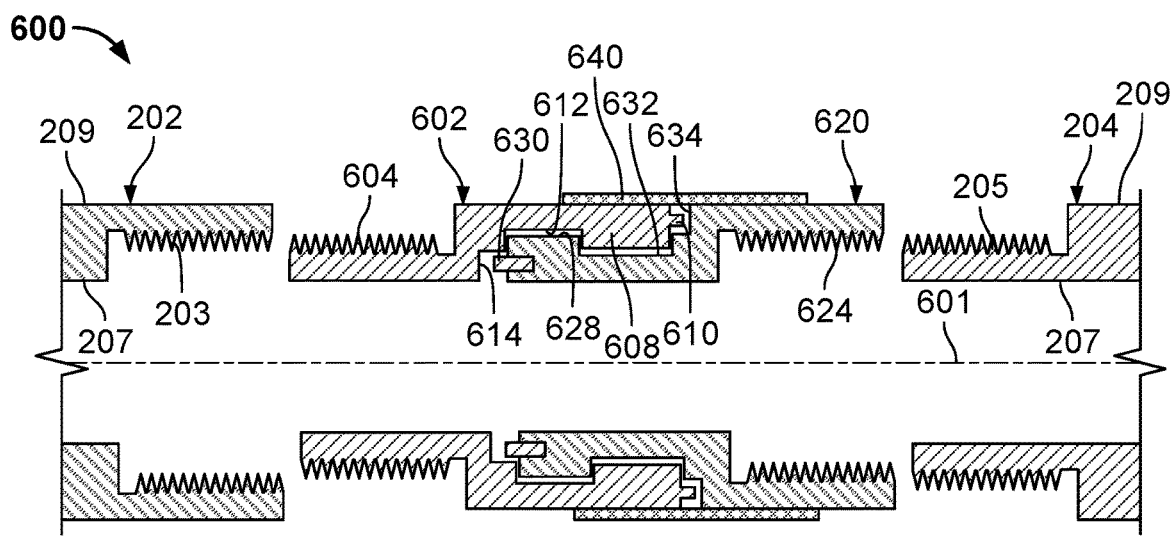
FIG. 6 is a schematic illustration of a cross-sectional view of a portion of another example implementation of a flexible casing string that can be used in a hazardous material repository according to the present disclosure.

In another example implementation of a stand-alone flexible casing joint, FIG. 6 illustrates a stand-alone flexible joint 600 for a casing string in which there are no hidden threads (e.g., threads within the joint sections themselves that are not readily visible from outside the structure). This differs from the implementation in FIG. 5, and can require a different assembly technique than for that shown in FIG. 5. The implementation of FIG. 6 can be similar to that of FIG. 5, except that there are no threads on the joint sections other than those for attaching to the casings. The absence of these internal threads can mean that, in manufacture, the stand-alone flexible casing joint sections cannot be made by screwing together two separate sections. There are many alternative ways to make the stand-alone flexible casing joint, however, including welding the pieces together, and screwing them together.

As shown in this example, the stand-alone flexible casing joint 600 is comprised of a joint section 602 and a joint section 620. The joint section 602 includes outer threads 604 (e.g., threads that are formed on an outer radial surface of the joint section) and a wedge 608 adjacent a slot 612. Generally, the wedge 608 has a radial greater thickness than the slot 612. The joint section 620 includes inner threads 624 (e.g., threads that are formed on an inner radial surface of the joint section) and a wedge 628 adjacent a slot 632. Generally, the wedge 628 has a radial greater thickness than the slot 632. As shown in FIG. 6, the joint sections 602 and 620 can be coupled together by inserting the wedges 628 and 608 into slots 612 and 632 respectively.

As further shown, in this example, the joint section 602 can include one or more pegs 610 formed on one axial end face along with one or more slots 614 formed on another, opposite axial end face of the section 602. Likewise, the joint section 620 can include one or more pegs 630 formed on one axial end face along with one or more slots 634 formed on another, opposite axial end face of the section 620. As described with reference to FIGS. 4A-4C, the illustrated pegs and slots can interface (when the joint sections 602 and 620 are in a compressed configuration) and prevent substantial rotation of one joint section based on rotation of the other joint section.

When assembly of the stand-alone flexible casing joint 600 occurs on the rig that is used to install the casing, it may be advantageous that the rig operations remember to put all pairs of casing that will need to be moved around the curve of a directional drillhole or wellbore apart, as no such—alone flexible casing joints may be required for the upper straight sections of the casing string. Many "reminder" mechanisms can be devised to assure that two sections of casing are not inadvertently attached to each other with no stand-alone flexible casing joint in-between (when such a joint is required). One reminder method can be to use a different thread spacing on the upper and lower sections so that the upper casing could thread into a joint section of the stand-alone flexible casing joint, but could not screw into the upper casing directly. There are many other even simpler methods. For example, the stand-alone flexible casing joint could have a bright color. After installing several dozen such parts, the operators would grow to expect them and notice if one is forgotten.

FIGS. 5-6, therefore, show example implementations of a stand-alone flexible casing joint that can couple two convention casing joints together and allow the casing joints to remain locked to each other, requiring, for example, a relative screw motion of many turns to separate them, and yet which can transmit force (both push and pull) and torque from one casing joint to another casing joint. To achieve this, a gas and water-tight seal may not occur between the casing joints, although this can be restored with a suitable flexible seal such as a sleeve.

Figure 7A:
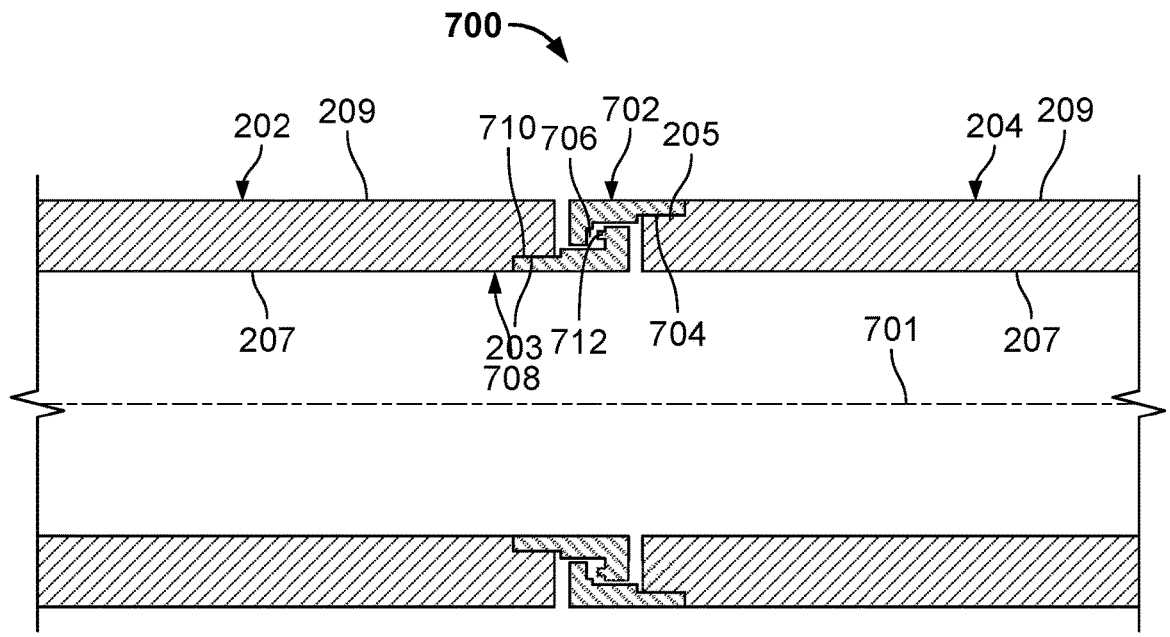
FIGS. 7A-7B are schematic illustrations of cross-sectional views of a portion of another example implementation of a flexible casing string that can be used in a hazardous material repository according to the present disclosure.
Figure 7B:
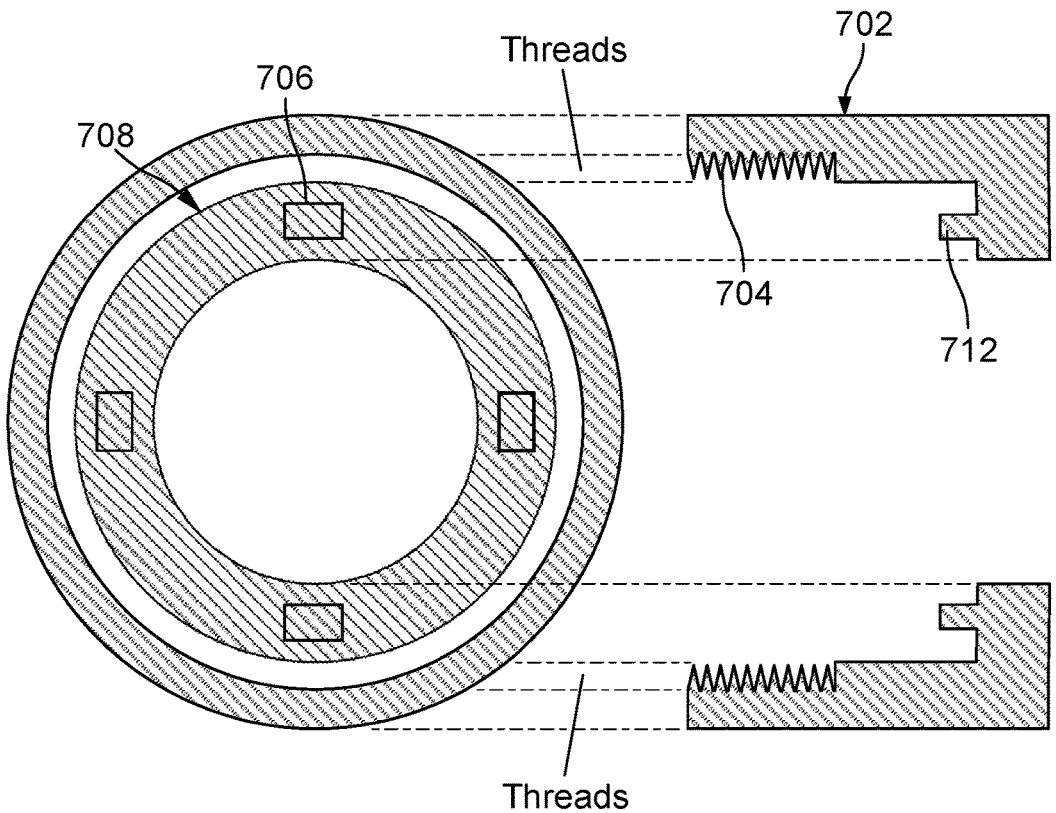

FIGS. 7A-7B illustrate another example implementation of a stand-alone flexible casing joint 700 according to the present disclosure. The stand-alone flexible casing joint 700 shown in axial cross-section in FIG. 7A also can couple two conventional casing joints 202 and 204 together and allow the casing joints 202 and 204 to remain locked to each other, requiring, for example, a relative screw motion (about an axis of symmetry 701) of many turns to separate them, and yet which can transmit force (both push and pull) and torque from one casing joint to another casing joint. While a sleeve is not shown in FIG. 7A, a sleeve such as the sleeve shown in FIGS. 5-6 can be added about the stand-alone flexible casing joint 700 in this implementation.

The stand-alone flexible casing joint 700 shown in FIG. 3 includes an inner ring 708 and an outer ring 702. The inner ring 708 is positioned inside the outer ring 702. Outer ring 702 includes threads 704 that can couple to the threads 205, while inner ring 708 includes threads 710 that can couple to the threads 203. In this example, the inner ring 708 can also include one or more pegs 712, while the outer ring 702 can include one or more slots 706. Alternatively, the pegs and slots can be reversed.

The combination of rings 702 and 708 can be, for example, threadingly attached to one casing joint (e.g., the female casing joint 202 on the left of the stand-alone flexible casing joint 700). This attachment could be done before the casing joint 202 is placed on the rig, or it could be done as the two casing joints 202 and 204 are joined on the rig. The next step likewise could take place on the rig or on the ground, depending on the length and ease of handling of the casing sections.

FIG. 7B illustrates a radial cross-section of the outer ring 702, and illustrates the outer ring 702 with female threading 704 and four male pegs 712 (which can be formed on this outer ring 702 or the inner ring 708 as shown in FIG. 7A). For example, in FIG. 7B, the outer ring 702 includes both male pegs 712 and female slots 706. In FIG. 7B, the thread 704 can be recessed so that the inner (male) ring 708 can pass through it. The inner ring 708, in this example, also has a male plug that will fit into a slot on the female (outer) ring 702. The size and number of plugs can vary, but the space between the plug and its corresponding slot can be large enough to accommodate an anticipated flex in the joint connector 700.

Figure 8:
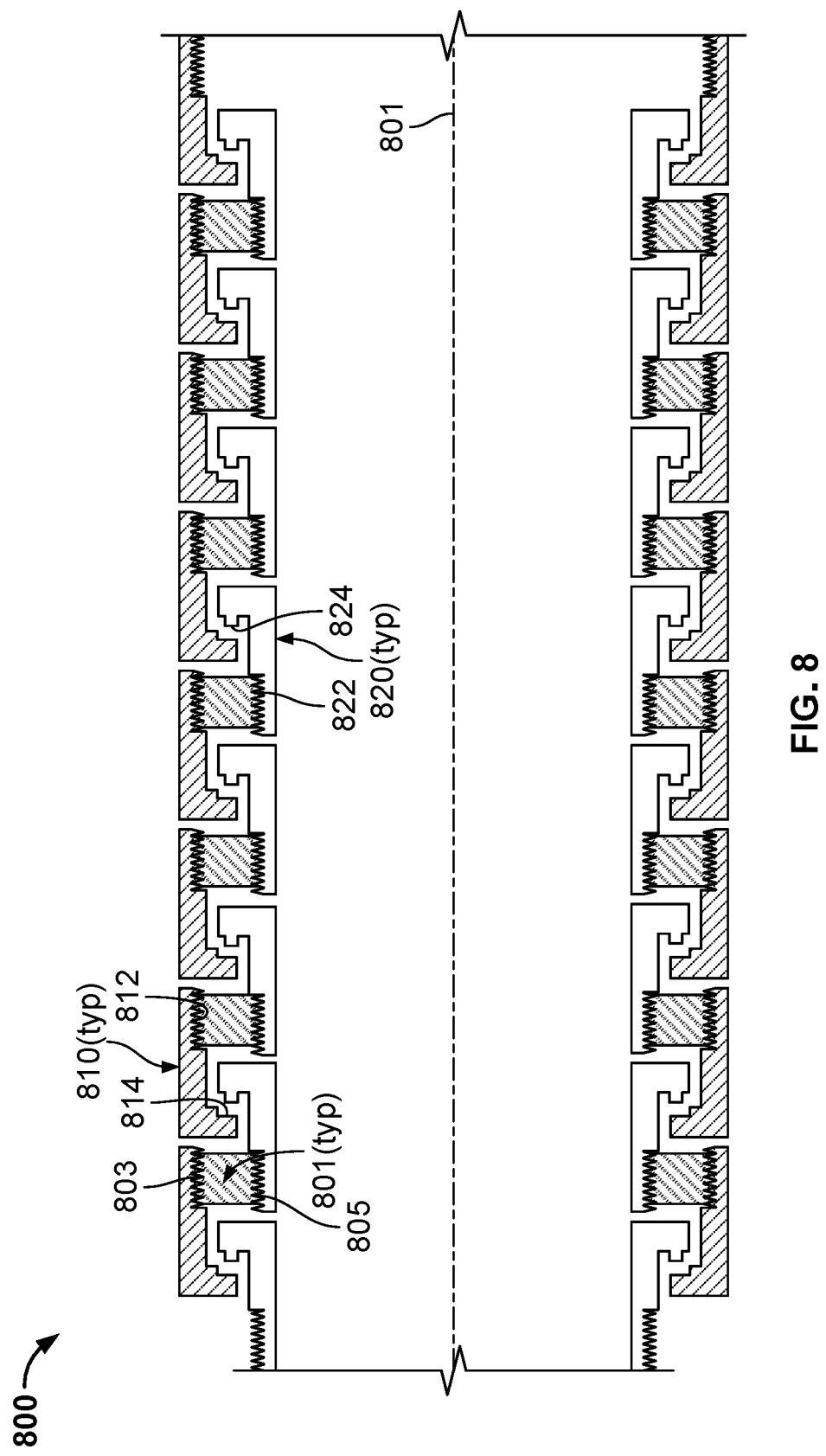
FIG. 8 is a schematic illustration of a cross-sectional view of a portion of another example implementation of a flexible casing string that can be used in a hazardous material repository according to the present disclosure.

FIG. 8 shows an example implementation of a flexible casing string 800 in the form of a "snake" casing string. A snake casing string may be formed, for example, by coupling casings 801 in which a length of each casing 801 is relatively short, e.g., less than or equal to twice a diameter of the casing 801. Thus, the entire casing string 800 (rather than just joints in a casing string) can display flexibility, although within limits. The snake casing string 800 can include short casing sections 801 as described, or by making an entire casing string out of stand-alone flexible casing joints shown in FIGS. 5-6.

For example, FIG. 8 illustrates the snake casing string 800 formed of interlocking stand-alone flexible casing joints made from inner rings 820 and outer rings 810 (similar to the inner and outer rings shown in FIG. 7A), attached to each other with short pieces of double-threaded casing 801. As shown, each inner ring 820 includes a threaded section 822 (to connect to inner threads 805 of a casing section 801) and one or more pegs 824. Each outer ring 810 includes a threaded section 812 (to connect to outer threads 803 of a casing section 801) and one or more slots 814. As in the other figures, the diameter of the casing has been reduced to allow both sides to fit in one diagram. In practice, the diameter is typically 30 times the thickness of the casing.

The snake casing string 800 shown in FIG. 8 can have a unit length (that is, a translational symmetry distance) that is approximately 1.7 times the thickness of the casing. If the casing has a diameter of 32 inches, with 1-inch thick walls, then the rate of change of angle could be 3° every 1.7 inches, which is 90° every 51 inches. Such highly flexible casing could be delivered to a hazardous waste repository site, pre-assembled, in a spool under 6 feet in diameter. Such a spool can be fed into a drillhole with a small rig, provided the rig is designed to hold the weight of several hundred or thousand feet of the snake casing string. Because the gaps between the casing sections are relatively small (e.g., less than 2 mm), a sleeve to cover the gaps could be very small as well.

In some aspects, in addition to or alternative to sleeves, gaps between the casing sections 801 can include one or more gaskets, such as O-rings. O-rings can be made of plastic or of a compressible material such as indium. In normal operation, the entire O-ring for the horizontal sections would not be compressed during lowering of the casing sections (or snake casing string) into the drillhole, but only when the casing sections are in a horizontal orientation, and being pushed by uphole-positioned casing sections (rather than being pulled by downhole-positioned casing sections). O-rings for the vertical and curved sections would be compressed when they are subject to the weight of casing sections behind them. Thus, a one-use O-ring such as indium, which compresses for a good seal but can lose that good seal when the casing sections are separated, could function to isolate the interior of the casing from an annulus between the casing and a subterranean formation.

An O-ring seal can also be used between an outer surface of the casing and a sleeve (such as sleeve 320 or other sleeves according to the present disclosure). For oil and gas drilling, the important lifetime of this seal is during placement up to the first time that the casing is filled with low-pressure fluid. When there is a strong pressure difference inside and outside the casing, the sleeve will be compressed tightly against the casing, and the O-ring will no longer be necessary to achieve the isolation. However, if the O-ring corrodes prior to that event, then fluid or gas can flow from the hole and into the casing string, equalize the pressure on both sides of the sleeve, and not press the sleeve against the outer surface of the casing. In this situation, a tight separate might not be achieved.

The snake casing string 800 may include several advantages. For example, the snake casing string 800 can exhibit a relatively very high curvature, and much of it can be pre-assembled. With a 32 inch diameter casing and a new 3° joint every 64 inches, a 90° curve can be achieved in 30 snake casing string segments with length 30×64=1920 inches=160 feet along the casing string. If the snake casing string 800 is formed into a 90° circular arc, the string can have a radius of about 100 feet. Rather than using a standard rig, the snake casing string 800 can be fed into a drillhole by using a static structure 100 feet high over which the casing string is slipped (or rotated over a rotating wheel) towards the hole. The weight of the casing string previously fed into the drillhole can supply the force needed to draw other portions of the snake casing string into the drillhole. A clamp near an entry of the drillhole can feed the snake casing string into the drillhole at an appropriate rate. This configuration allows the snake casing string to be assembled on the ground, and then fed into the drillhole with reduced danger to human workers.

Figure 9A:
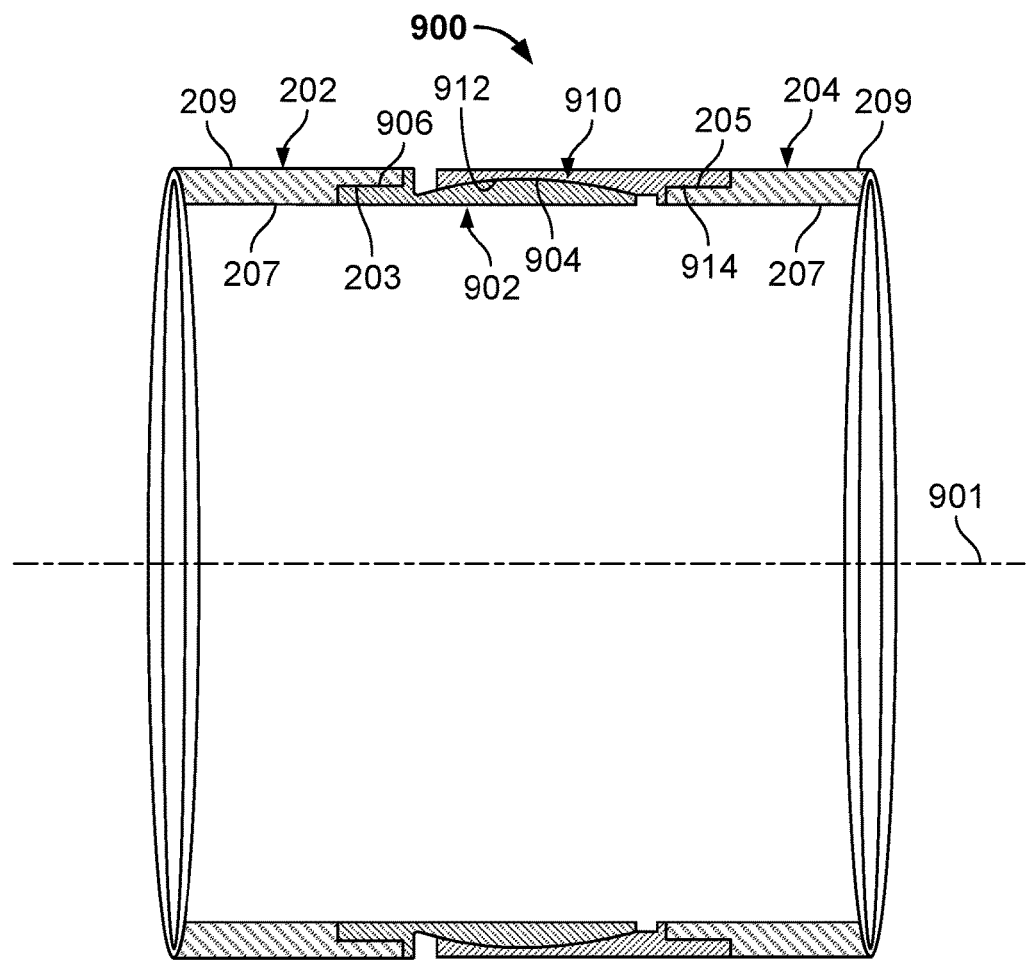
FIGS. 9A-9C are schematic illustrations of cross-sectional views of a portion of another example implementation of a flexible casing string that can be used in a hazardous material repository according to the present disclosure.
Figure 9B:
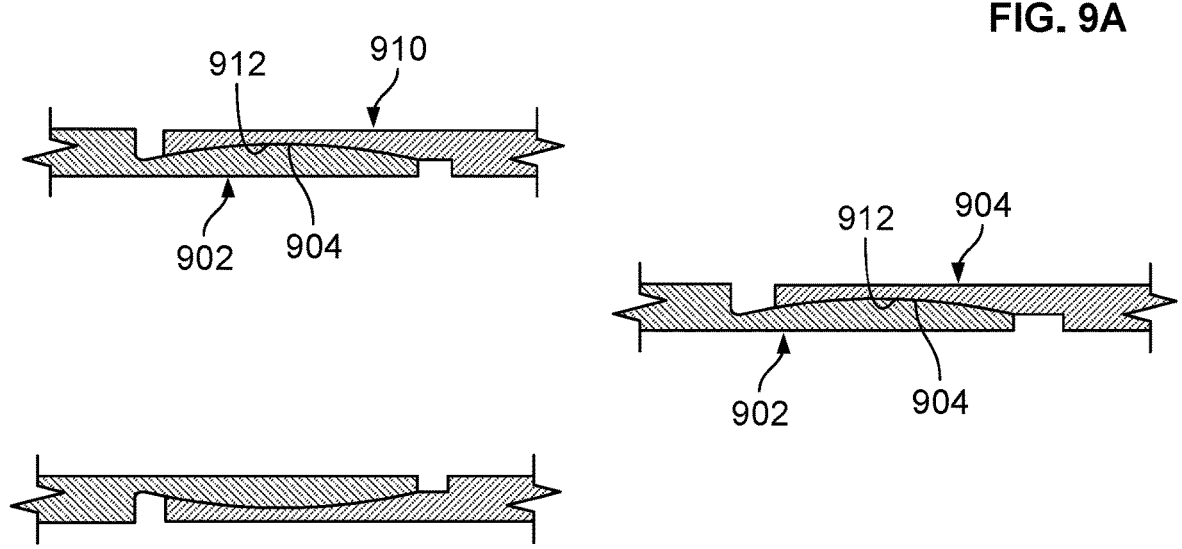
Figure 9C:
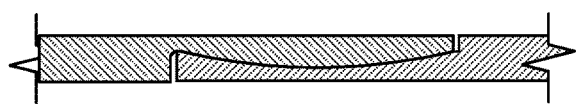

Another example implementation of a stand-alone flexible casing joint according to the present disclosure is illustrated in FIGS. 9A-9C, which shows a ball joint connector 900 that connects female casing joint 202 with male casing joint 204. In this figure, the ball joint connector 900 includes inner socket ring 902 that includes threads 906 to couple to the threads 203 of the female casing joint 202. The inner socket ring 902 also includes a convex portion 904. The ball joint connector 900 also includes outer socket ring 910 that includes threads 914 to couple to the threads 205 of the male casing joint 204. The outer socket ring 910 also includes a concave portion 912.

In the ball joint connector 900 shown in FIG. 9A, the connector 900 has two parts, which can move with respect to each other. As shown, the convex portion 904 of the inner socket ring 902 and concave portion 912 of the outer socket ring 910 have, for example, the same radius of curvature, and when fitted together (as in FIG. 9A) they can slide past each other, maintaining contact, and resulting in a ball joint. Each socket ring 902 and 910 of the ball joint connector 900 can be rigidly (or otherwise) attached to an end of a casing joint as shown. In FIG. 9A, the connector 900 is threaded (e.g., rotated about an axis of symmetry 901) into the casing joints 202 and 204. Other attachment techniques can include welding or mortise-tenon joints, as examples.

In the ball joint connector 900, if there is a bending force placed on the connection, in any direction, the convex and concave portions 904 and 912, respectively, can slide over each other and allow the ball joint connector 900 to bend. For example, FIG. 9B shows an unbent connection, and FIG. 9C shows a bent configuration, in which the outer socket ring 910 has rotated around the center of the sphere by about 2°. For the design shown in FIG. 9C, the 2° bend can be the limit of the bend, since the non-spherical parts of the ball joint connector 900 can limit the range, as shown.

Figure 10:
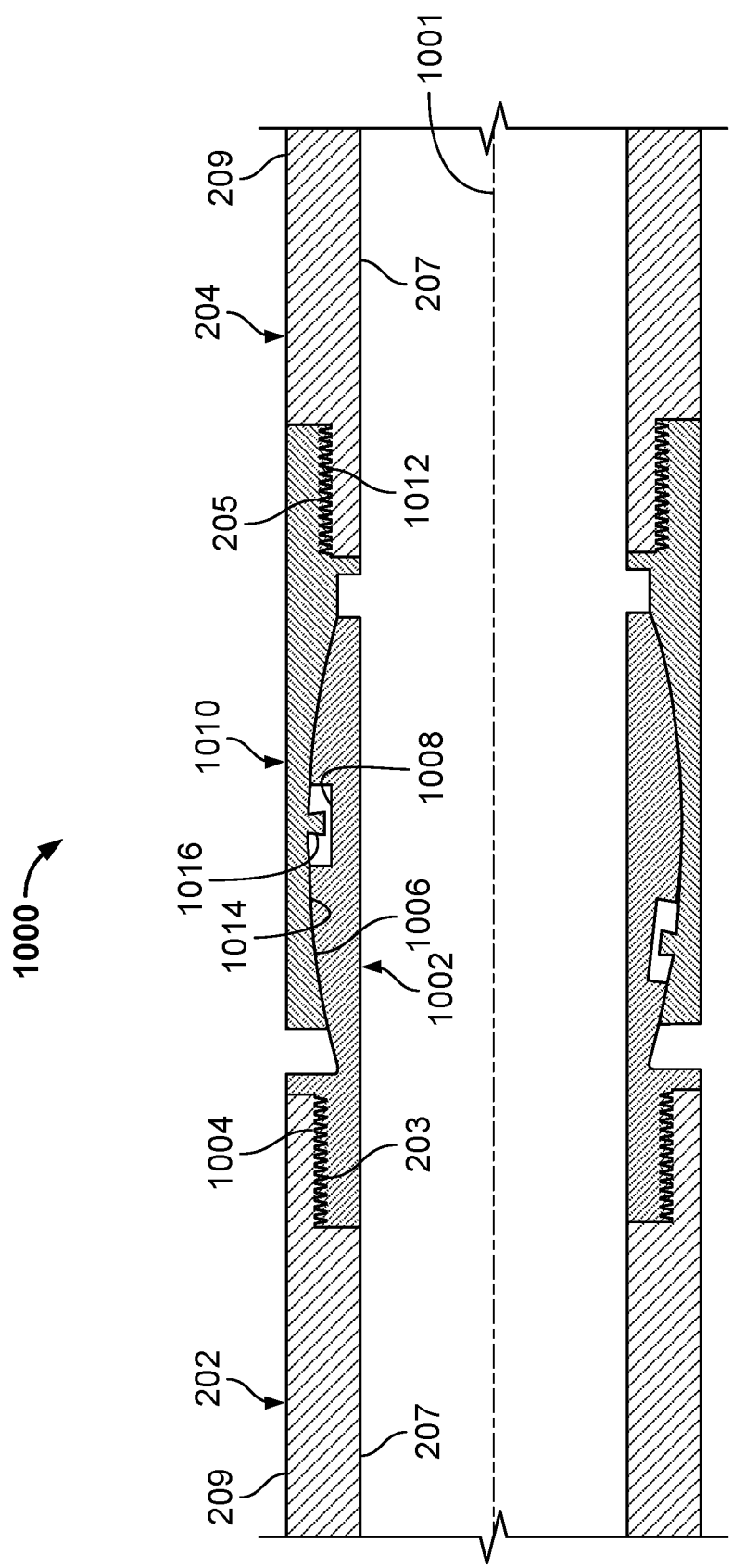
FIG. 10 is a schematic illustration of a cross-sectional view of a portion of another example implementation of a flexible casing string that can be used in a hazardous material repository according to the present disclosure.

FIG. 10 shows another example implementation of a ball joint connector 1000 as a stand-alone flexible casing joint; the ball joint connector 1000 connects female casing joint 202 with male casing joint 204. As shown, the ball joint connector 1000 includes an inner socket ring 1002 and an outer socket ring 1010. The inner socket ring 1002 includes, as shown, threads 1004 to couple to the threads 203 of the female casing joint 202, a convex portion 1006, and a socket (or sockets) 1008 which forms a slot in the convex portion 1006. The outer socket ring 1010 includes, as shown, threads 1012 to couple to the threads 205 of the male casing joint 204, a concave portion 1014, and a plug (or plugs) 1016 formed on a surface of the concave portion 1014.

FIG. 10 shows a cross-section of the casing string with the ball joint connector 1000. (The upper and lower sections have been moved closer to each other to allow detail to be seen.) In FIG. 10, the example implementation of the ball joint connector 1000 includes plug(s) 1016 and socket(s) 1008 to, for example, limit a relative rotation of the two casing joints 202 and 204 about an axis of symmetry 1001 and to limit separation (axial movement) of the two casing joints 202 and 204.

In some aspects, the illustrated plug(s) 1016 and socket(s) 1008 can be used to convey torque from one casing joint, across the illustrated ball joint connector 1000, to the other casing joint. The rotation limitation can be implemented by the plug(s) 1016 and socket(s) 1008, loosely fitting (to allow flex of the joint) but which can prevent unlimited rotation of the one without conveying torque to the other. When the casing connection is flexed, one of the rotation-limiting plugs 1016 can become free of its corresponding socket 1008. For example, in FIG. 10, if the outer socket ring 1010 is flexed downward, an upper plug 1016 (the plug 1016 shown on the top of the cross-section) could become disengaged with its socket 1008, but the lower plug 1016 (the plug 1016 shown on the bottom of the cross-section) can enter its socket 1008 more deeply. One or more of the plug/socket pairs can, e.g., always be engaged, so rotation of one casing joint can result in rotation of the other casing joint.

In FIG. 10, as shown, the inner socket ring 1002 is securely held in place by the outer socket ring 1010 due to, for example, cylindrical symmetry of the rings. Thus, if the inner socket ring 1002 is pushed to the right (in the figure), it can push on the outer socket ring 1010; thus, axial force can be transported across the ball joint connector 1000. For example, to force the outer socket ring 1010 open to release the inner socket ring 1002 may take a force delivered by about 1 km of casing (assuming carbon steel, 30-inch diameter, and 1-inch thick.) The addition of the axial motion limiter (e.g., the plug/socket combinations) can prevent the relative axial motion of the socket rings 1002 and 1010 from reaching a point at which the two rings 1002 and 1010 may separate.

In some aspects, a fit between the inner socket ring 1002 and outer socket ring 1010 can be relatively tight to fluidly isolate a volume outside of the casing from a volume inside of the casing. In some aspects, a lubricant can be put between the two casing joints 202 and 204, or a flexible sealant such as indium, or it could be coated, or it could be left untreated. Pressure difference between the inside and the outside of the casing can push to close the space and help the seal. Thus, this design could be used for applications (such as oil and gas extraction) that benefit from such fluid isolation (even if such fluid isolation is not always critical or necessary to a hazardous waste repository).

Another example implementation of a ball joint connector 1100 is shown in FIGS. 11A-11B. The ball joint connector 1100 includes a female connector 1102 and a male connector 1108. As shown in the example, the female connector 1102 includes a flange 1104, a bore 1105, and a female contact surface 1106, which, in this example, is a concave surface. As shown in the example, the male connector 1108 includes a flange 1110, a bore 1114, and a male contact surface 1112, which, in this example, is a convex surface. The concave and convex surfaces, therefore, form spherical (or partially spherical) surfaces in which the concave surface can receive the convex surface upon engagement of the female connector 1102 and the male connector 1108.

FIG. 11A shows, on the left, a side view of the female connector 1102 and the male connector 1108 prior to engagement, as well as an end view of the female connector 1102 (which shows the bore 1105 as well as a ring of bolt holes in the flange 1104). FIG. 11A shows, on the right, a side view of the female connector 1102 and the male connector 1108 upon engagement, as well as an end view of the female connector 1102 (which shows the bore 1105 as well as a ring of bolt holes in the flange 1104). In the example engagement of FIG. 11A, the ball joint connector 1100 is made up by attaching rods 1120 (e.g., threaded or "flex" rods) through the respective flanges 1104 and 1110 (e.g., through the respective bolt holes) to receive a connecting nut. The inset in the right portion of FIG. 11A shows a cross-section of a rod 1120 passing through the flange 1110 of the male connector 1108; the fit can be snug. Relative motion of the female connector 1102 and the male connector 1108 can come primarily from bending of the flex rods.

The surface of each part of each section that contacts the other section is spherical (or partially spherical) in shape; thus, the two sections, when in contact, can flex with respect to each other smoothly. (Limiters, not shown, can limit the range of flex, as they did in the previous designs disclosed in this document.) The attachment rings can be rigidly attached to the first and second sections, such as by welding or being integral parts of the section. As shown, there can be holes in the attachment rings that allow rods to be strung through. The two sections are assembled in (C) by rods. The rods, in this example implementation, are not parallel to the axis of the casing, but angled. In the preferred configuration, the angle with respect to the axis of the casing is approximately 30°.

The illustrated flex rods 1120 can tightly hold the female connector 1102 and the male connector 1108 together. The two matching spherical surfaces, convex on the female contact surface 1106 and concave on the male contact surface 1112, can slip past each other only by the application of sufficient force to cause the flex rods 1120 to bend. When the rods 1120 bend, the flex rods 1120 themselves can be curved between the two connectors 1102 and 1108. In some aspects, the diameter of the flex rods 1120 can be chosen to allow a flexure as the casing (with connectors) is lowered into the curved section of a directional drillhole, yet strong enough to be able to support, under tension, the weight of hundreds of feet of casing. Under this weight, the angle of the rods 1120 can decrease from (in the example configuration) an angle of 30° to an angle of 25° or less.

In some aspects, space between the two connectors 1102 and 1108 can be left empty, or a seal material (such as indium) could be placed between the two contact surfaces 1106 and 1112. The tightness of the fit and the force applied by the flex rods 1120 can be sufficient to allow the casing connector 1100 to maintain a gas or liquid pressure difference between the inside of a casing and the outside of a casing.

In some aspects, use of flex rods 1120 is not required. For example, any spring under tension can be used to keep the two sections in contact, but allow the sections to slide over each other for a limited distance when a torque is applied between the two connectors 1102 and 1108. This is shown in FIG. 11B, which illustrates the ball joint connector 1100 with springs 1113 (or, more generally biasing members). In some aspects, a sleeve (such as sleeve 320) could be placed around the external surface of the ball joint connector 1100, such as covering the connection where two connectors 1102 and 1108 meet, to provide a redundant isolation between the inside of the casing/connector/casing combination and the outside of the casing/connector/casing combination. Note that the springs 1113 need not be a separate component, but could be part of the connector sides.

Figure 12A:
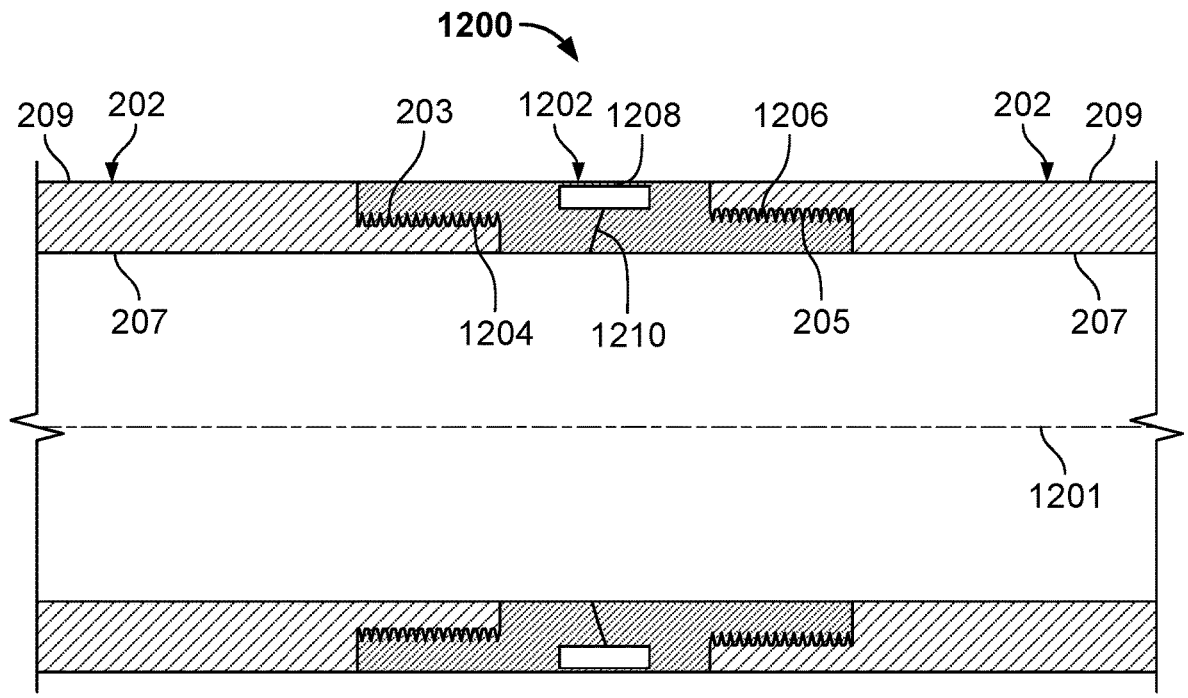
FIGS. 12A-12D are schematic illustrations of cross-sectional views of a portion of other example implementations of a flexible casing string that can be used in a hazardous material repository according to the present disclosure.

FIG. 12A shows another example implementation of a stand-alone flexible casing joint 1200 that is a single piece connector (although in manufacture, it might consist of several pieces that are then attached to each other, by welding, screw connectors, or other means). FIG. 12A shows the stand-alone flexible casing joint 1200 that includes threads 1204 that couple with the threads 203 of the female casing joint 202, as well as threads 1206 that coupled with the threads 205 of the male casing joint 204. A bridge 1208 extends across the stand-alone flexible casing joint 1200 at an outer surface of the joint 1200, while a curved surface 1210 is formed between an inner surface of the joint 1200 and the bridge 1208. The bridge 1208, therefore, can connect two sections of the joint 1200 (separated by the curved surface 1210) into a single structure. If a bending torque is placed on one casing joint with respect to the other casing joint, then the curved surface 1210 can allow the two sections to flex with respect to each other. That rotation can be resisted by the bridge 1208, but because the bridge 1208 can be thin (compared to the casing), then the bridge 1208 can flex also (e.g., stretch or buckle) to accommodate the bending. thereby providing a flexible connection between the female casing joint 202 and the male casing joint 204.

Note that in FIG. 12A, the only path for gas or liquid to flow from outside the casing to inside, or vice-versa, is through the threaded portions (e.g., at the interface of threads 1204 and 203, and/or at the interface of threads 1206 and 205). Thus, this stand-alone flexible casing joint 1200 can provide fluid isolation of the interior from the exterior equal to that of a conventional casing joint threaded connection.

In some aspects, the thickness of the bridge 1208 can be determined by one or more criteria. When the casing string is vertical, the bridge 1208 should be strong enough to support the weight of the casing string hanging from it (e.g., downhole of the stand-alone flexible casing joint 1200). The bridge 1208 can be thin enough to allow stretching and buckling when the joint is flexed. The bridge 1208 can also provide the coupling of torque from one casing joint to another casing joint (about an axis of symmetry 1201). In some aspects, the bridge 1208 can be made of a different material from the connector 1202 (and also the casing joints).

Figure 12B:
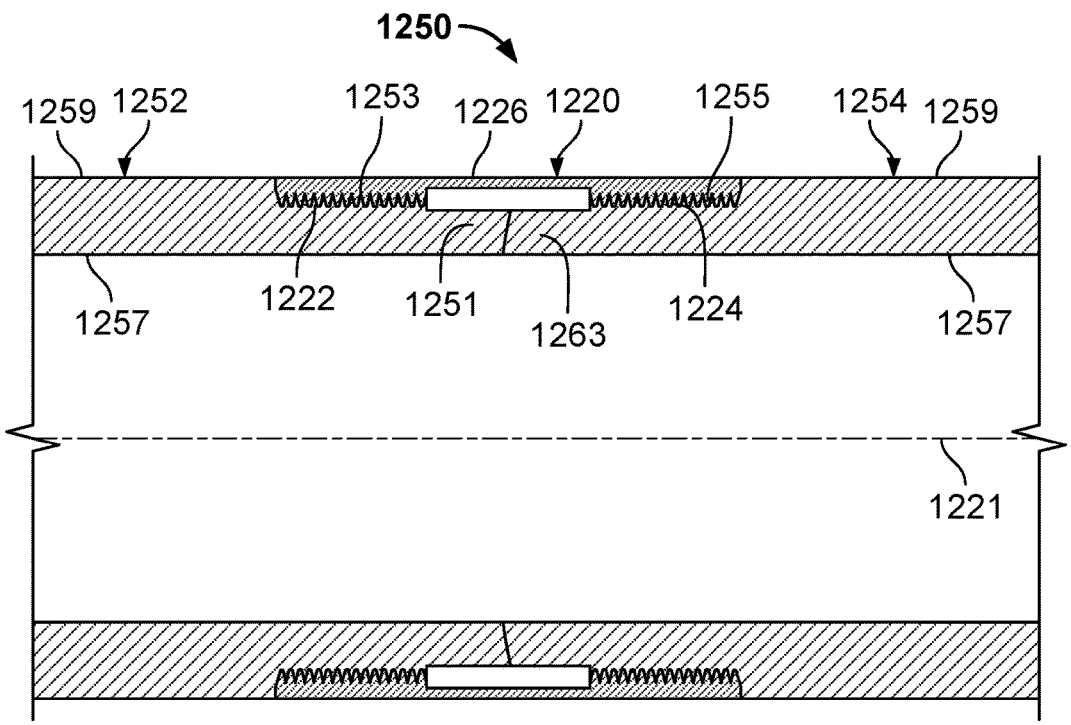

FIG. 12B shows an example implementation of modified casing joints that form a ball joint connector 1250 according to the present disclosure. For example, as shown in FIG. 12B, a casing joint 1252 includes (male) threads 1253 and an axial extension 125 that, in some aspects, ends in a curved surface (e.g., a convex surface). A casing joint 1254 includes (male) threads 1255 and an axial extension 1263 that, in some aspects, ends in a curved surface (e.g., a concave surface). As shown, each casing joint 1252 and 1254 includes an outer surface 1259 and an inner surface 1257 adjacent an axis of symmetry 1221.

The ball joint connector 1250 also includes a connector bridge 1220 that includes threads 1222 to mate with threads 1253, threads 1224 to mate with threads 1255, as well as a connecting portion 1226 between the threads. When the connector bridge 1220 is fully threaded to the casing joints 1252 and 1254, the curved surfaces of the respective axial extensions 1251 and 1263 meet to form a spherical surface interface. In some aspects, the spherical interface is well-approximated by a conical interface, shown in FIG. 12C.

Figure 12C:
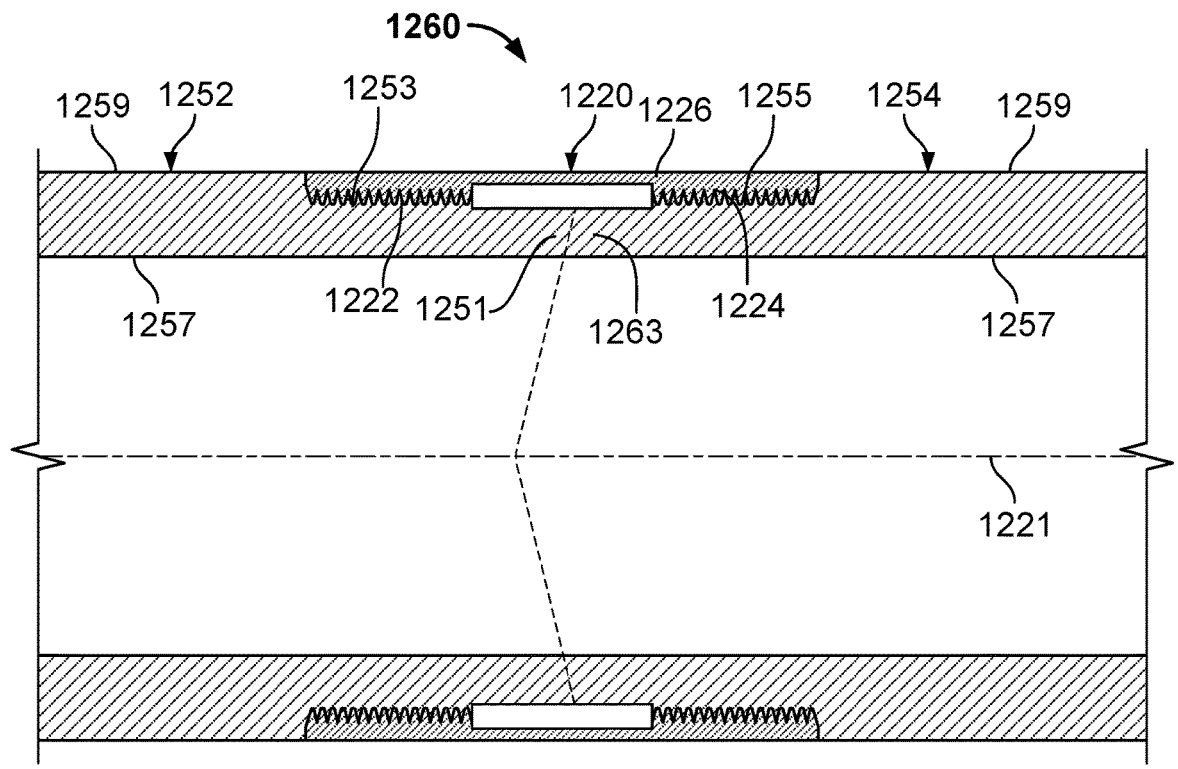

In the example implementation of FIGS. 12B-12C, the flexing can occur by a stretching of the connector bridge 1220 at one end (e.g., at a threaded connection to one of the casing joints) and a compression of the bridge 1220 at another, opposite end (e.g., at a threaded connection to the other of the casing joints). Depending on the thickness of the connecting portion 1226, the compression may take the form of a buckling, rather than that of a compression. Either case can maintain the integrity of the connection and the seal between the interior and the exterior of the casing.

Figure 12D:
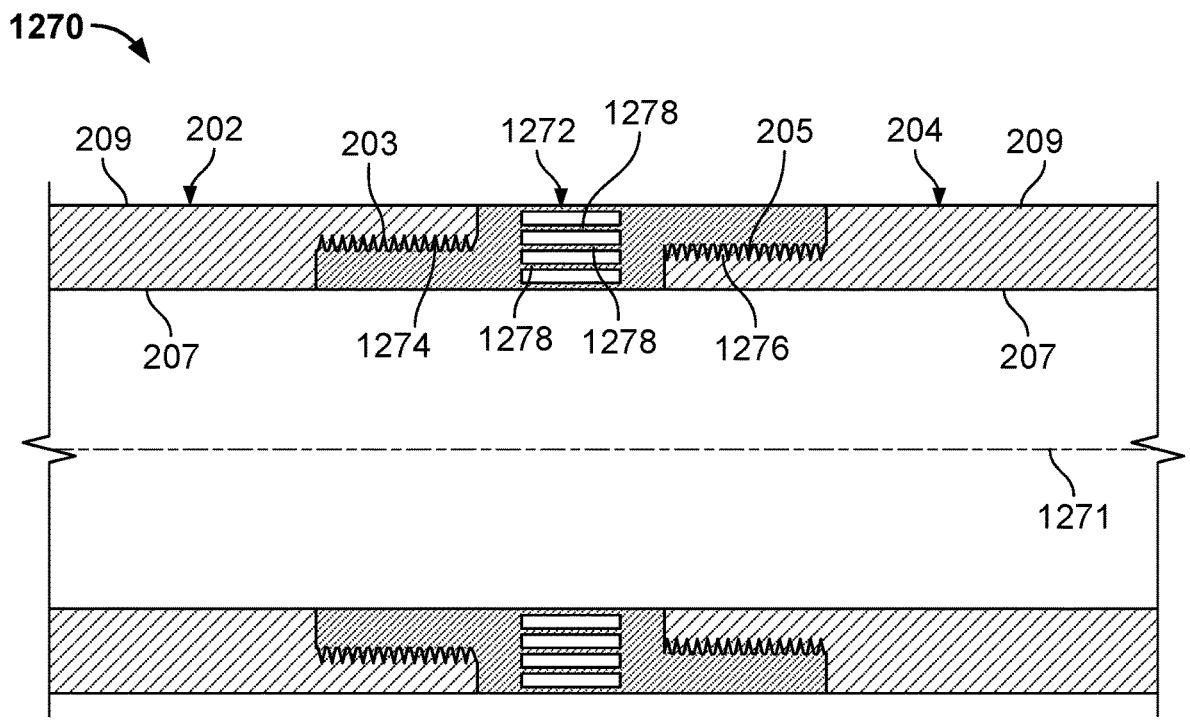

FIG. 12D shows another example implementation of a stand-alone flexible casing joint 1270 that includes a bridge connector 1272 (e.g., similar to that of FIGS. 12B-12C), but with multiple bridges 1278 instead of a single bridge (i.e., connecting portion 1226). Unlike other implementations of a stand-alone flexible casing joint, this stand-alone flexible casing joint or "multi-bridge" design (e.g., two or more bridges) has no parts that slide past each other.

In the example implementation of FIG. 12D, the stand-alone flexible casing joint 1270 is threadingly attached to two conventional casing joints 202 and 204. For example, as shown, the stand-alone flexible casing joint 1270 includes threads 1274 that can mate with the threads 203 of the female casing joint 202, as well as threads 1276 that can mate with the threads 205 of the male casing joint 204. The bridges 1278 of the bridge connector 1272 are formed between the threads 1274 and 1276.

In this example, the stand-alone flexible casing joint 1270 can be made more flexible than the casing joints by making the connector 1272 out of multiple bridges 1278. In this example configuration, when not flexed, each of these bridges 1278 has cylindrical symmetry around an axis of symmetry 1271 of the casing. Each of these bridges 1278 (as, e.g., concentric tubes) can contribute to a strength of the casing, but because the bridges 1278 are separated (yet concentric), they allow the joint 1270 to flex more readily.

In some aspects, because of the reduced material in the bridges 1278 (relative to a solid member between the threads 1274 and 1276), there is a possibility that corrosion through the bridges 1278 can take place in a shorter period of time than through the casing. This rate can be reduced by filling the space between the bridges 1278 with a flexible solid (such as indium). The bridge corrosion rate can also be reduced by making the bridge material out of a corrosion-resistant material, such as Alloy-22.

In some aspects, the flexibility of the stand-alone flexible casing joint 1270 of FIG. 12D can be increased by making the bridges 1278 slotted, that is, having holes in them to increase their flexibility and also to decrease their tensile modulus. If desired, one or more of the bridges 1278 can be left without slots in order to provide isolation of the exterior from the interior of the casing.

When one of the attached casing joints 202 or 204 is flexed with respect to the other, the flexure can take place primarily in the bridges 1278. For example, consider the particular case when the male casing joint 204 is flexed downward. Then it is possible that the upper part of the stand-alone flexible casing joint 1270, e.g., the bridges 1278 along or adjacent an outer radial surface of the connector 1272, will stretch, and that the bridges 1278 along or adjacent an inner radial surface of the connector 1272 will compress. However, if the separate bridges 1278 are made sufficiently thin, then they are unlikely to compress, but will instead buckle. Since the buckling force is typically less than the force for stretching, in some cases, the bridges 1278 along or adjacent the outer radial surface of the connector 1272 may not stretch significantly, but most of the bending may take place through the buckling of the bridges 1278 along or adjacent the inner radial surface of the connector 1272.

Another aspect of the stand-alone flexible casing joint 1270 shown in FIG. 12D is the compressive strength of the connector 1272. In some applications, such as pushing a casing string along a horizontal or upward tilted path, the multiple bridges 1278 can buckle. For any given application, this buckling can be allowed or suppressed by the design of the thickness of each individual bridge 1278. In some aspects, the force for moving the casing string is less than the force for flexing the casing; when that is the case, then the bridges 1278 can be made in a thickness such that they will not flex when the casing string is being pushed, but will flex when the casing string is made to move around a curve. Such bridge flexing, ultimately, may not affect the functionality of the stand-alone flexible casing joint 1270 (or the casing string) in a drillhole of a hazardous waste repository.

As shown in FIG. 12D, the stand-alone flexible casing joint 1270 can be threaded onto the two conventional casings (i.e., female casing joint 202 and male casing joint 204). However, the stand-alone flexible casing joint 1270 can be made a permanent part of one joint of the casing and then only one threading is necessary on the rig (e.g., to another casing section) during running of the casing string into the drillhole.

The stand-alone flexible casing joint 1270 of FIG. 12D can be made of the same material as that of the casing joints 202 and 204, or it could be made of a different material (e.g., fiberglass or plastic). For example, the stand-alone flexible casing joint 1270 can be made of a metal that is not as brittle as the casing joints 202 and 204. If there is a partial collapse of the drillhole in which a hazardous waste repository is formed, the casing is normally designed to withstand the localized force so that the drillhole remains open. Most of this force is a result of the hoop strength of the casing. In FIG. 12D, the bridges 1278 can have low hoop strength because of their individual relatively small thickness (compared to that of the casing joints 202 and 204). However, the strength of the bridges 1278 against collapse is enhanced by the adjacent thick portions (i.e., at the threads 1274 and 1276) of the connector 1272 and the adjacent casing joints. By limiting the span (that is, an axial length) of the bridges 1278, the stand-alone flexible casing joint 1270 can support both an interior-exterior pressure differential, and additional forces caused by partial drillhole collapse. In another example implementation, multiple stand-alone flexible casing joints 1270 of the type shown in FIG. 12D can be coupled (e.g., threadingly) together to form a snake casing string, such as analogous to the snake casing string shown in FIG. 8.

The present disclosure describes several example implementations. In a first example implementation, a stand-alone flexible casing joint includes a first end configured to couple to a first casing section; a second end configured to couple to a second casing section; and a connector that flexibly couples the first end to the second end.

In an example aspect combinable with the first example implementation, the connector is integrally formed with the first and second ends.

In another example aspect combinable with any of the previous aspects of the first example implementation, the connector includes a first threaded portion coupled to the first end and a second threaded portion coupled to the second end.

In another example aspect combinable with any of the previous aspects of the first example implementation, the first threaded portion couples to the second threaded portion to flexibly couple the first end to the second end.

In another example aspect combinable with any of the previous aspects of the first example implementation, the first threaded portion couples to the second threaded portion by threading the first and second threaded portion together until threads on the first threaded portion are disengaged with threads on the second threaded portion to flexibly couple the first end to the second end.

Another example aspect combinable with any of the previous aspects of the first example implementation further includes a sleeve that circumscribes a portion of the connector at an interface of the first and second threaded portions.

In another example aspect combinable with any of the previous aspects of the first example implementation, the connector includes a first portion integrally formed with the first end that includes a plurality of slots; and a second portion integrally formed with the second end that includes a plurality of plugs sized to fit within the plurality of slots to flexibly couple the first end to the second end.

Another example aspect combinable with any of the previous aspects of the first example implementation further includes a sleeve that circumscribes a portion of the connector at an interface of the first and second portions.

In another example aspect combinable with any of the previous aspects of the first example implementation, the first casing section includes a first end of a shortened casing section, and the second casing section includes a second end of the shortened casing section.

In another example aspect combinable with any of the previous aspects of the first example implementation, the connector includes a ball joint connector.

In another example aspect combinable with any of the previous aspects of the first example implementation, the ball joint connector includes a first spherical surface portion integrally formed with the first end and a second spherical surface portion integrally formed with the second end, the first and second spherical surfaces configured to interface to flexibly couple the first end to the second end.

In another example aspect combinable with any of the previous aspects of the first example implementation, the first spherical surface portion includes a convex surface and the second spherical surface portion includes a concave surface.

In another example aspect combinable with any of the previous aspects of the first example implementation, one of the first or second spherical surface portions includes a slot formed in the spherical surface and the other of the first or second spherical surface portions includes a plug formed on the spherical surface and sized to fit within the slot to limit a relative movement of the first and second spherical surface portions during flexing of the connector.

In another example aspect combinable with any of the previous aspects of the first example implementation, the first spherical surface portion includes a first ring that includes a first plurality of holes, and the second spherical surface portion includes a second ring that includes a second plurality of holes, each of the first and second plurality of holes sized to receive a flex rod or a spring therethrough to flexibly couple the first and second spherical surface portions.

In another example aspect combinable with any of the previous aspects of the first example implementation, each flex rod includes two bolt ends configured to each receive a nut.

In another example aspect combinable with any of the previous aspects of the first example implementation, the connector includes at least one bridge portion integrally formed between the first and second ends that flexibly couples the first end to the second end.

In another example aspect combinable with any of the previous aspects of the first example implementation, the at least one bridge portion includes a plurality of bridge portions.

In another example aspect combinable with any of the previous aspects of the first example implementation, a thickness of the at least one bridge portion is configured to allow flexure of the connector based on a force applied to the casing joint.

In another example aspect combinable with any of the previous aspects of the first example implementation, the first end is formed into an end of the first casing section and includes a first spherical surface, and the second end is formed into an end of the second casing section and includes a second spherical surface.

In another example aspect combinable with any of the previous aspects of the first example implementation, the connector includes a connector bridge that threadingly engages the first and second casing sections.

In another example aspect combinable with any of the previous aspects of the first example implementation, the first and second spherical surfaces are configured to interface to flexibly couple the first end to the second end.

In a second example implementation, a casing string system includes a plurality of stand-alone flexible casing joints of any one of the example aspects of the first example implementation; and a plurality of casing sections coupled together by the plurality of the stand-alone flexible casing joints.

In a third example implementation, a snake casing string includes a plurality of the stand-alone flexible casing; and a plurality of shortened casing sections coupled together by the plurality of the stand-alone flexible casing joints. Each of the plurality of the stand-alone flexible casing joints includes a connector that includes a first threaded portion coupled to a first end and a second threaded portion coupled to a second end, and the first threaded portion couples to the second threaded portion to flexibly couple the first end to the second end.

In a fourth example implementation, a snake casing string includes a plurality of the stand-alone flexible casing joints; and a plurality of shortened casing sections coupled together by the plurality of the stand-alone flexible casing joints. Each of the plurality of the stand-alone flexible casing joints includes a connector that includes a first portion integrally formed with a first end that includes a plurality of slots; and a second portion integrally formed with a second end that includes a plurality of plugs sized to fit within the plurality of slots to flexibly couple the first end to the second end.

In a fifth example implementation, a snake casing string includes a plurality of the stand-alone flexible casing joints; and a plurality of shortened casing sections coupled together by the plurality of the stand-alone flexible casing joints. Each of the plurality of the stand-alone flexible casing joints includes a connector that includes at least one bridge portion integrally formed between first and second ends that flexibly couples the first end to the second end.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A casing joint, comprising:
   a tubular comprising a particular length, a particular diameter, and a first wall thickness;
   a male connection formed on a first end of the tubular, the male connection comprising an axial length and a plurality of threads formed on a portion of an external surface of the male connection less than the axial length of the male connection; and
   a female connection formed on a second end of the tubular opposite the first end, the female connection comprising an axial length and a plurality of threads formed on a portion of an internal surface of the female connection less than the axial length of the female connection,
   wherein each of the male connection and the female connection is configured to form a fluid permeable connection with a respective another female connection and another male connection that is angularly flexible up to 3 degrees.

2. The casing joint of claim 1, wherein the male connection comprises a second wall thickness less than or equal to the first wall thickness.

3. The casing joint of claim 2, wherein the female connection comprises a third wall thickness less than or equal to the first wall thickness.

4. The casing joint of claim 3, wherein the second and third wall thicknesses are equal or substantially equal.

5. The casing joint of claim 1, wherein the axial length of the male connection and the axial length of the female connection are equal or substantially equal.

6. The casing joint of claim 1, wherein the male connection further comprises a non-threaded surface formed on another portion of the external surface of the male connection less than the axial length of the male connection and separate from the portion of the external surface of the male connection that comprises the plurality of threads.

7. The casing joint of claim 6, wherein the portion of the external surface of the male connection that comprises the plurality of threads is at an end of the first end of the tubular, and the non-threaded surface formed on the another portion of the external surface of the male connection is between the plurality of threads and the second end of the tubular.

8. The casing joint of claim 1, wherein the female connection further comprises a non-threaded surface formed on another portion of the internal surface of the female connection less than the axial length of the female connection and separate from the portion of the internal surface of the female connection that comprises the plurality of threads.

9. The casing joint of claim 8, wherein the portion of the internal surface of the female connection that comprises the plurality of threads is at an end of the second end of the tubular, and the non-threaded surface formed on the another portion of the internal surface of the female connection is between the plurality of threads and the first end of the tubular.

10. The casing joint of claim 1, wherein the male connection comprises one or more slots formed on an axial surface of the male connection.

11. The casing joint of claim 10, wherein the female connection comprises one or more pegs formed on an axial surface of the female connection.

12. The casing joint of claim 1, wherein the male connection comprises one or more slots formed on a first axial surface of the male connection and one or more pegs formed on a second axial surface of the male connection.

13. The casing joint of claim 12, wherein the female connection comprises one or more pegs formed on a first axial surface of the female connection and one or more slots formed on a second axial surface of the female connection.

14. A flexible casing connection, comprising:
   a first casing joint, comprising:
   a first tubular, a first male connection formed on a first end of the first tubular, the first male connection comprising an axial length and a plurality of threads formed on a first portion of an external surface of the first male connection less than the axial length of the first male connection, and a first female connection formed on a second end of the first tubular opposite the first end, the first female connection comprising an axial length and a plurality of threads formed on a first portion of an internal surface of the first female connection less than the axial length of the first female connection;

a second casing joint, comprising:
a second tubular comprising a particular length, a particular diameter, and a second wall thickness,
a second male connection formed on a first end of the second tubular, the second male connection comprising an axial length and a plurality of threads formed on a first portion of an external surface of the second male connection less than the axial length of the second male connection, and
a second female connection formed on a second end of the second tubular opposite the first end, the second female connection comprising an axial length and a plurality of threads formed on a first portion of an internal surface of the second female connection less than the axial length of the second female connection, where the plurality of threads of the second female connection are configured to rotate through the plurality of threads of the first male connection to be adjacent a second portion of the external surface of the first male connection exclusive of the first portion of the external surface of the first male connection; and a sleeve positioned over a portion of each of the first male connection and the second female connection and a radial gap between the first male connection and the second female connection.

15. The flexible casing connection of claim 14, wherein the flexible casing connection comprises a bend of up to 3° between the first casing joint and the second casing joint based on the plurality of threads of the second female connection adjacent the second portion of the external surface of the first male connection exclusive of the first portion of the external surface of the first male connection.

16. The flexible casing connection of claim 14, wherein the first male connection comprises one or more pegs formed on an axial surface of the first end of the first tubular, and the second female connection comprises one or more slots formed on an axial surface of the second end of the second tubular that are configured to engage with the one or more pegs.

17. The flexible casing connection of claim 16, wherein each of the one or more pegs comprises a rectangular cross-section.

18. The flexible casing connection of claim 16, wherein the one or more pegs comprises four pegs, and the one or more slots comprises four slots.

19. The flexible casing connection of claim 14, wherein the second portion of the external surface of the first male connection is free of any of the plurality of threads of the first male connection.

20. A casing joint, comprising:
a tubular comprising a particular length, a particular diameter, and a first wall thickness;
a male connection formed on a first end of the tubular, the male connection comprising an axial length and a plurality of threads formed on a portion of an external surface of the male connection less than the axial length of the male connection, the male connection comprising a plurality of slots formed on a first axial surface of the first end of the tubular and a plurality of pegs formed on a second axial surface of the first end of the tubular, the male connection further comprising a non-threaded surface formed on another portion of the external surface of the male connection less than the axial length of the male connection and separate from the portion of the external surface of the male connection that comprises the plurality of threads; and a female connection formed on a second end of the tubular opposite the first end, the female connection comprising an axial length and a plurality of threads formed on a portion of an internal surface of the female connection less than the axial length of the female connection, wherein the portion of the external surface of the male connection that comprises the plurality of threads is at an end of the first end of the tubular, and the non-threaded surface formed on the another portion of the external surface of the male connection is between the plurality of threads and the second end of the tubular.

21. The casing joint of claim 20, wherein the female connection comprises a plurality of slots formed on a first axial surface of the second end of the tubular and a plurality of pegs formed on a second axial surface of the second end of the tubular.

22. The casing joint of claim 20, wherein the plurality of pegs formed on the second axial surface of the first end of the tubular comprises four pegs formed on the second axial surface of the first end of the tubular.

23. The casing joint of claim 22, wherein the four pegs are radially spaced apart on the second axial surface.

24. The casing joint of claim 20, wherein the male connection comprises a second wall thickness less than or equal to the first wall thickness.

25. The casing joint of claim 24, wherein the female connection comprises a third wall thickness less than or equal to the first wall thickness.

26. The casing joint of claim 25, wherein the second and third wall thicknesses are equal or substantially equal.

27. The casing joint of claim 20, wherein the axial length of the male connection and the axial length of the female connection are equal or substantially equal.

28. The casing joint of claim 20, wherein the female connection further comprises a non-threaded surface formed on another portion of the internal surface of the female connection less than the axial length of the female connection and separate from the portion of the internal surface of the female connection that comprises the plurality of threads.

29. The casing joint of claim 28, wherein the portion of the internal surface of the female connection that comprises the plurality of threads is at an end of the second end of the tubular, and the non-threaded surface formed on the another portion of the internal surface of the female connection is between the plurality of threads and the first end of the tubular.

30. A casing joint, comprising:
a tubular comprising a particular length, a particular diameter, and a first wall thickness;
a male connection formed on a first end of the tubular, the male connection comprising an axial length and a plurality of threads formed on a portion of an external surface of the male connection less than the axial length of the male connection, the male connection comprising a plurality of slots formed on a first axial surface of the first end of the tubular and a plurality of pegs formed on a second axial surface of the first end of the tubular; and a female connection formed on a second end of the tubular opposite the first end, the female connection comprising an axial length and a plurality of threads formed on a portion of an internal surface of the female connection less than the axial length of the female connection, the female connection further comprising a non-threaded surface formed on another portion of the internal surface of the female connection less than the axial length of the female connection and separate from the portion of the internal surface of the female connection that comprises the plurality of threads, wherein the portion of the internal surface of the female connection that comprises the plurality of threads is at an end of the second end of the tubular, and the non-threaded surface formed on the another portion of the internal surface of the female connection is between the plurality of threads and the first end of the tubular.

31. The casing joint of claim 30, wherein the female connection comprises a plurality of slots formed on a first axial surface of the second end of the tubular and a plurality of pegs formed on a second axial surface of the second end of the tubular.

32. The casing joint of claim 30, wherein the plurality of pegs formed on the second axial surface of the first end of the tubular comprises four pegs formed on the second axial surface of the first end of the tubular.

33. The casing joint of claim 30, wherein the four pegs are radially spaced apart on the second axial surface.

34. The casing joint of claim 30, wherein the male connection comprises a second wall thickness less than or equal to the first wall thickness.

35. The casing joint of claim 34, wherein the female connection comprises a third wall thickness less than or equal to the first wall thickness.

36. The casing joint of claim 35, wherein the second and third wall thicknesses are equal or substantially equal.

37. The casing joint of claim 30, wherein the axial length of the male connection and the axial length of the female connection are equal or substantially equal.

* * * * *